(12) United States Patent
Nguyen et al.

(10) Patent No.: US 10,558,688 B1
(45) Date of Patent: Feb. 11, 2020

(54) NATURAL LANGUAGE INTERFACE FOR DATA ANALYSIS

(71) Applicant: Arimo, Inc., Mountain View, CA (US)

(72) Inventors: Christopher Nguyen, Los Altos, CA (US); Anh H. Trinh, Mountain View, CA (US); Khang Pham, Milpitas, CA (US)

(73) Assignee: ARIMO, LLC, Mountain View, CA (US)

( * ) Notice: Subject to any disclaimer, the term of this patent is extended or adjusted under 35 U.S.C. 154(b) by 539 days.

(21) Appl. No.: 15/091,478

(22) Filed: Apr. 5, 2016

Related U.S. Application Data

(60) Provisional application No. 62/148,114, filed on Apr. 15, 2015.

(51) Int. Cl.
*G06F 16/332* (2019.01)
*G06N 20/00* (2019.01)
*G06F 17/24* (2006.01)

(52) U.S. Cl.
CPC ...... *G06F 16/3329* (2019.01); *G06F 16/3322* (2019.01); *G06F 17/248* (2013.01); *G06N 20/00* (2019.01)

(58) Field of Classification Search
CPC ................. G06F 17/30654; G06F 16/258
See application file for complete search history.

(56) References Cited

U.S. PATENT DOCUMENTS

| | | | |
|---|---|---|---|
| 8,447,771 B2 | 5/2013 | Kearsey et al. | |
| 9,201,915 B2 * | 12/2015 | Takenouchi | H04L 63/04 |
| 9,342,570 B2 * | 5/2016 | Mandelstein | G06F 16/254 |
| 2004/0073539 A1 | 4/2004 | Dettinger et al. | |
| 2004/0078364 A1 | 4/2004 | Ripley et al. | |
| 2005/0080803 A1 | 4/2005 | Sauermann | |
| 2007/0094060 A1 | 4/2007 | Apps et al. | |

(Continued)

OTHER PUBLICATIONS

"Methodology of the Monthly Index of Services Annex B: The Holt-Winters Forecasting Method Single Exponential Smoothing," 2001, 5 pages.

(Continued)

*Primary Examiner* — Usmaan Saeed
*Assistant Examiner* — David M Nafziger
(74) *Attorney, Agent, or Firm* — Fenwick & West LLP

(57) ABSTRACT

A data analysis system allows users to interact with distributed data structures stored in-memory using natural language queries. The data analysis system receives a prefix of a natural language query from the user. The data analysis system provides suggestions of terms to the user for adding to the prefix. Accordingly, the data analysis system iteratively receives longer and longer prefixes of the natural language queries until a complete natural language query is received. The data analysis system stores natural language query templates that represent natural language queries associated a particular intent. For example, a natural language query template may represent queries that compare two columns of a dataset. The data analysis system compares an input prefix of natural language with the natural language query templates to determine the suggestions. The data analysis system receives user defined metrics or attributes that can be used in the natural language queries.

18 Claims, 19 Drawing Sheets

(56) References Cited

U.S. PATENT DOCUMENTS

| | | |
|---|---|---|
| 2008/0104037 A1 | 5/2008 | Bierner |
| 2008/0313224 A1* | 12/2008 | Griffith .................. G01W 1/00 |
| 2009/0112835 A1 | 4/2009 | Elder |
| 2010/0191760 A1* | 7/2010 | Kusumura ........... G06F 16/258 |
| | | 707/760 |
| 2010/0205180 A1 | 8/2010 | Cooper et al. |
| 2011/0004702 A1* | 1/2011 | Tsofi .................. H04L 67/1095 |
| | | 709/248 |
| 2011/0295870 A1 | 12/2011 | Bolsius et al. |
| 2011/0314010 A1 | 12/2011 | Ganti et al. |
| 2012/0265787 A1* | 10/2012 | Hsu .................... G06F 16/3322 |
| | | 707/780 |
| 2013/0282702 A1 | 10/2013 | Zhu et al. |
| 2014/0095542 A1* | 4/2014 | Zelevinsky ............ G06F 16/26 |
| | | 707/776 |
| 2014/0201126 A1* | 7/2014 | Zadeh .................... G06N 7/005 |
| | | 706/52 |
| 2014/0344250 A1* | 11/2014 | Topatan ........... G06F 16/90324 |
| | | 707/722 |
| 2014/0365885 A1 | 12/2014 | Carson et al. |
| 2015/0012524 A1 | 1/2015 | Heymans et al. |
| 2015/0026212 A1 | 1/2015 | Fink et al. |
| 2015/0081279 A1 | 3/2015 | Suleman et al. |
| 2015/0088844 A1 | 3/2015 | Stigsen et al. |
| 2015/0153906 A1* | 6/2015 | Liao ...................... G06F 3/0481 |
| | | 715/709 |
| 2015/0220640 A1 | 8/2015 | Dhillon et al. |
| 2015/0227633 A1 | 8/2015 | Shapira |
| 2015/0269176 A1* | 9/2015 | Marantz ........... G06F 16/90324 |
| | | 707/767 |
| 2015/0278370 A1 | 10/2015 | Stratvert et al. |
| 2015/0286684 A1 | 10/2015 | Heinz et al. |
| 2015/0350429 A1* | 12/2015 | Kumar .................... G10L 15/19 |
| | | 379/88.01 |
| 2016/0070708 A1* | 3/2016 | Labbi ................ G06F 16/24578 |
| | | 707/723 |
| 2016/0179922 A1 | 6/2016 | Crupi et al. |
| 2016/0224667 A1* | 8/2016 | Yao ..................... G06F 16/2455 |
| 2017/0011742 A1 | 1/2017 | Jing et al. |
| 2017/0154125 A1* | 6/2017 | Balakrishnan ...... G06F 3/04842 |
| 2017/0161268 A1 | 6/2017 | Badaskar |
| 2018/0204111 A1* | 7/2018 | Zadeh .................. G06N 3/0436 |

OTHER PUBLICATIONS

Sun, Y., "Articulate: Creating Meaningful Visualizations from Natural Language," University of Illinois at Chicago, Thesis for Doctor of Philosophy in Computer Science, 2012, 105 pages.

Sun, Y. et al., "Articulate: A Semi-automated Model for Translating Natural Language Queries into Meaningful Visualizations," SG 2010, LNCS 6133, 2010, pp. 184-195.

* cited by examiner

Query String 410c

Query String 410d

Query String 410e

Fig. 4G

Query String 410h is profit related to s|
do you mean
relationships
show relationship between profit and sales
show relationship between profit and shipmode
show relationship between profit and shippingcost

Fig. 4H

NATURAL LANGUAGE INTERFACE FOR DATA ANALYSIS

CROSS REFERENCE TO RELATED APPLICATIONS

This application claims the benefits of U.S. Provisional Application No. 62/148,114 filed on Apr. 15, 2015, which is incorporated by reference in its entirety.

BACKGROUND

Field of Art

The disclosure relates to interfaces for analyzing datasets using data analysis systems, for example, parallel or distributed systems in general and more specifically to interacting with datasets for performing data analysis using a natural language interface.

DESCRIPTION OF THE RELATED ART

Enterprises produce large amount of data based on their daily activities. This data is stored in a distributed fashion among a large number of computer systems. For example, large amount of information is stored as logs of various systems of the enterprise. Typically, this information may be available in different formats as unstructured as well as structured data. Conventional techniques available for processing such large amount of data typically require users to perform cumbersome programming. Users have to deal with complex systems that perform parallel/distributed programming to be able to process such data. Software developers and programmers (also called data engineers) who are experts at programming and using such complex systems typically do not have the knowledge of a business expert or a data scientist. Therefore these data engineers are not able to identify the requirements for the analysis. Nor are the data engineers able to analyze the results on their own.

As a result, there is a gap between the users identifying requirements and analyzing results and the users programming the parallel/distributed systems based on the requirements to achieve the results. This gap results in time consuming communications between the business experts/data scientists and the data engineers. Data scientists, business experts, as well as data engineers act as resources of an enterprise. Inefficient utilization of their time adds significant costs to the process of data analysis. Furthermore, this gap leads to possibilities of errors in the analysis since a data engineer can misinterpret certain requirements and may generate incorrect results. The business experts or the data scientists do not have the time or the expertise to verify the software developed by the developers to verify its accuracy. Therefore conventional techniques for providing insights into big data stored in distributed systems of an enterprise fail to provide suitable interface for users to analyze the large amount of information available in the enterprise.

SUMMARY

Embodiments allow use of natural language queries for analyzing datasets. A system allows users to iteratively build a natural language query by specifying longer and longer prefixes of the target natural language query. A system stores natural language query templates. Each natural language query template comprises components of a natural language query including one or more attributes of a dataset, natural language keywords, and information describing order of the various components. The system presents a user interface for allowing a user to input a natural language query. The system receives an input query string via the user interface and initializes a current query string value to the input query string. The system incrementally builds a target natural language query as follows by allowing a user to build larger and larger query strings. The system compares the current query string against the natural language query templates. The system determines alternative suggestions for each matching natural language query template, each alternative suggestions comprising one or more terms following the current query string. The system sends one or more alternative suggestions to the user. The system receives a selection of an alternative suggestion. The system modifies the current query string based on the received selection of the alternative suggestion. The system may further receive via the user interface a modification of the current query string or an indication that the query string is a complete natural language query. If the system receives a modification of the current query string, the system continues the above iteratively. If the system receives an indication that the current query represents a complete natural language query, the system executes the complete natural language query.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 4A-4I show screenshots of a user interface illustrating the process of iteratively defining a natural language query for big data analysis, according to an embodiment.

Figure 1:
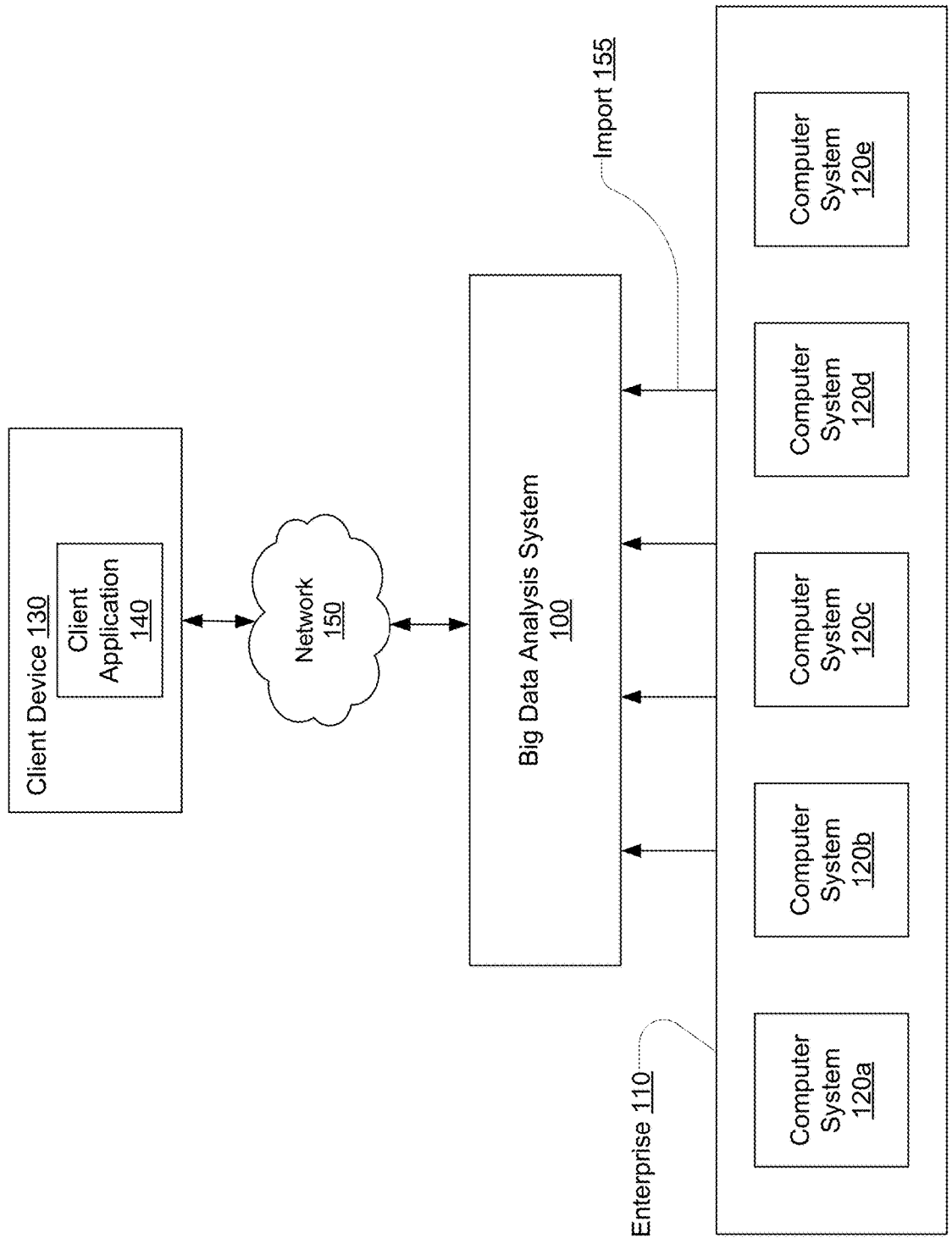
FIG. 1 shows the overall system environment for performing analysis of big data, in accordance with an embodiment of the invention.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

A data analysis system allows users to perform analysis of data sets, for example, data generated by an enterprise. In an embodiment, the data analysis system is a big data analysis system that performs analysis of big data. Enterprises typically generate large amount of data via various mechanisms, for example, logs of various applications and operating systems executing on computers of the enterprise, data manually entered by operators, data received from third party applications, vendors and so on. Often data generated by large enterprises or by large distributed systems is so large and complex that traditional data processing applications such as traditional databases, spreadsheet applications, and so on are inadequate for processing the data. The capacities of conventional data processing systems keep increasing every year. Accordingly, the data that is considered big data at some point in time may not be big data at a later point in time. As a result, the threshold size of data that qualifies the data as big data is a moving target.

Data typically considered big data has one or more of the following characteristics. The volume (or size) of the data is typically very large (above a threshold value). The dataset includes a variety of data, for example, a mix of structured and unstructured data and/or a mix of data having different structures, format, and so on. The data is typically generated on a regular basis, for example, data is constantly produced by systems of an enterprise. Data is complex and typically generated by multiple sources and needs to be linked and correlated in order to process the information.

Data analysis of such data is performed by distributed systems using complex software that often requires involvement of software developers or data engineers. Embodiments allow data scientists to perform analysis of such data without requiring them to learn complexities of the underlying system and data representations. Furthermore, embodiments support high-level data analytics functionality, thereby allowing users to focus on the data analysis rather than low level implementation details of how to manage large data sets.

Embodiments of the data analysis system allow user to interact with the system via natural language queries. The data analysis system interacts with a user and allows a user to incrementally build a natural language query that precisely states the user request. The system presents the end user with a user interface to build the natural language query. The user enters a query string as an input for building a natural language query. As the user enters the query string, the system prompts the user with alternative suggestions that may be selected to build a larger query string associated with the natural language query that the user intends to ask. The system provides suggestions for a portion (e.g., a prefix) of a natural language query that could potentially replace the input query string. The user may accept one of the suggestions and modify it if necessary. The system receives the next query string that is typically longer than the previous query string. The system further prompts the user with suggestions applicable to the longer query string. This process continues iteratively, thereby allowing the user to incrementally build the natural language query. The data analysis system received longer and longer query strings until the system determines that the query string received is a specification of a complete natural language query. In an embodiment, the user provides an indication that the input query string is a complete query string, for example, by clicking on a submit button. If the data analysis system determines that a complete natural language query is received, the data analysis system executes the complete natural language query.

The system analyzes the input query string entered by the user at each stage to determine an incrementally larger query string towards building a complete natural language query. A query string may be a substring of the natural language query being built, but may not be. The system may determine that the next portion of the query is a keyword. Accordingly, the system identifies all applicable keywords and suggests them to the user. Alternatively, the system may determine that the next portion of the query is an expression. Accordingly, the system identifies data set attributes that may be applicable to the next portion or operators applicable to the next portion and suggests these to the user. A dataset attribute can be a column of the dataset, an expression based on columns of the dataset, or a user defined metric based on columns of the dataset.

The system may determine that the next portion of the query is an operator within an expression. Accordingly, the system identifies various operators that are applicable to an operand previously entered and suggests them. For example, if a numeric operand was selected by the user, the system may suggest numeric operations (for example, arithmetic operators such as plus, minus, multiple, divide etc. rather than logical operators such as AND, OR, and so on.) If the system determines that the user selected a first operand and an operator, the system identifies a second operand that is applicable to the first operand and the selected operator. For example, if the user selected a numeric column as a first operand and a plus operator, the system identifies remaining numeric columns of the dataset and suggests them (rather than date columns or string columns.)

In general, the system associates operators with types of data that each operator processes. For example, a logical operator can process boolean data, an arithmetic operator can process numeric data. A natural language query template may include an expression that combines one or more operands with operators. For example, an expression may specify a first operand combined with a second operand by an operator. Certain natural language query templates may limit the operator to a particular set of operators, for example, boolean operators or arithmetic operators. In an embodiment, the system receives a selection of a column of a dataset as the first operand. The system determines alternative suggestions for the operator and the second operand based on the selection of the column corresponding to the first operand. For example, if the column selected for the first operand is numeric (i.e., integer, or decimal values), the system limits the possible suggestions for the operator to arithmetic operators. Similarly, the system limits the possible suggestions for the second operand based on the selection of the first operand. For example, if the column selected as the first operand stores data of numeric type, the system may present alternative suggestions for the operator as arithmetic operator along with alternative suggestions for the second operand based on other numeric columns of the dataset.

In an embodiment, the system selects the size of the alternative suggestions (i.e., the number of keywords or terms suggested) based on the total number of alternative suggestions for the input query string. Accordingly, the system avoids presenting the user with too many or too few suggestions. Presenting the user with too few suggestions increases the number of iterations that the user is required to complete a natural language query. On the other hand, presenting the user with too many suggestions (say hundreds of suggestions) makes it a poor user experience since the user had to scroll through a large number of entries to identify a particular entry. In general, if including N keywords in the suggested portion results in very few (less than a threshold say 2 or 3) suggestions, the system suggests more than N keywords. However, if the number of suggestions is more than a threshold (say 50), the system suggests alternatives for less than N keywords.

Furthermore, the system allows users to specify structure of natural language sentences that are typically used by users of the system. The system receives information describing the arrangement of keywords, attributes of the dataset processed by the query, and a representation of an intent of the natural language query. The system stores this information as a natural language query template. The system may store a large number of natural language query templates. If a user provides a natural language query, the system matches the natural language query against stored natural language query templates. The process of incrementally building the natural language queries based on suggestions provided by the system ensures that the natural language query built conforms to natural language query templates stored in the system.

The ability to allow users to specify natural language query templates and use them makes the system extensible. Furthermore, each set of users interacting with a system can customize the system to process natural language queries typically asked in a particular domain. Even though users may not be able to use arbitrary natural language sentences to query the system, the data scientists that use the system are interested in specific types of natural language queries and not in an ability to use arbitrary natural language sentences. Data scientists and business experts prefer to be able to accurately specify their requirements (without having to learn a complex system) than have the ability to state arbitrary natural language sentences. Therefore, the systems disclosed herein provide the right balance of the simplicity of natural languages with the ability to precisely specify the requirements.

The systems disclosed herein also allow users to extend the system by specifying user defined metrics (or user defined keywords.) Each enterprise may use specific metrics for analyzing and presenting information. For example, one enterprise may measure revenue using one metric whereas another enterprise may measure revenue using another metric. Embodiments allow users to define metrics that can be used in natural language queries. A natural language query template may be defined based on user defined metrics. Accordingly, natural language queries conforming to that natural language query template can use user defined metrics (as attributes).

In an embodiment, the user defined metrics are specified using a syntax that is similar to programming languages. Therefore, user defined metrics may be defined by data engineers that are software developers working in collaboration with data scientists. A user defined metric that is incorporated in the system can be used by end users (i.e., data scientists) for various natural language queries. Therefore, the effort involved in developing the user defined metric is a one-time effort that provides benefits to several users and over several different types of natural language queries.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment

FIG. 1 shows the overall system environment for performing analysis of big data, in accordance with an embodiment of the invention. The overall system environment includes an enterprise 110, a big data analysis system 100, a network 150 and client devices 130. Other embodiments can use more or less or different systems than those illustrated in FIG. 1. Functions of various modules and systems described herein can be implemented by other modules and/or systems than those described herein. Although the system described herein performs analysis of big data, the embodiments described herein are applicable to any kind of data analysis.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120" and/or "120" in the figures).

The enterprise 110 is any business or organization that uses computer systems for processing its data. Enterprises 110 are typically associated with a business activity, for example, sale of certain products or services but can be any organization or groups of organizations that generates significant amount of data. The enterprise 110 includes several computer systems 120 for processing information of the enterprise. For example, a business may use computer systems for performing various tasks related to the products or services offered by the business. These tasks include sales transactions, inventory management, employee activities, workflow coordination, information technology management, and so on.

Performing these tasks generates large amount of data for the enterprise. For example, an enterprise may perform thousands of transactions daily. Different types of information is generated for each transaction including information describing the product/services involved in the transaction, errors/warning generated by the system during transactions, information describing involvement of personnel from the enterprise, for example, sales representative, technical support, and so on. This information accumulates over days, weeks, months, and years, resulting in large amount of data.

As an example of an enterprise, an airline may process data of hundreds of thousands of passengers traveling every day and large numbers of flights carrying passengers every day. The information describing the flights and passengers of each flight over few years can be several terabytes of data. Other enterprises that process petabytes of data are not uncommon. Similarly, search engines may store information describing millions of searches performed by users on a daily basis that can generate terabytes of data in a short time interval. As another example, social networking systems can have hundreds of millions of users. These users interact daily with the social networking system generating petabytes of data.

The big data analysis system 100 allows analysis of the large amount of data generated by the enterprise. The big data analysis system 100 may include a large number of processors for analyzing the data of the enterprise 110. In some embodiments, the big data analysis system 100 is part of the enterprise 110 and utilizes computer systems 120 of the enterprise 110. Data from the computer systems 120 of enterprise 110 that generate the data is imported 155 into the computer systems that perform the big data analysis.

The client devices 130 are used by users of the big data analysis system 100 to perform the analysis and study of data obtained from the enterprise 110. The users of the client devices 130 include data analysts, data engineers, and business experts. In an embodiment, the client device 130 executes a client application 140 that allows users to interact with the big data analysis system 100. For example, the client application 140 executing on the client device 130 may be an internet browser that interacts with web servers of the big data analysis system 100.

Systems and applications shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc.

The interactions between the client devices 130 and the big data analysis system 100 are typically performed via a network 150, for example, via the internet. The interactions between the big data analysis system 100 and the computer systems 120 of the enterprise 110 are also typically performed via a network 150. In one embodiment, the network uses standard communications technologies and/or protocols. In another embodiment, the various entities interacting with each other, for example, the big data analysis system 100, the client devices 130, and the computer systems 120 can use custom and/or dedicated data communications technologies instead of, or in addition to, the ones described above. Depending upon the embodiment, the network can also include links to other networks such as the Internet.

System Architecture

Figure 2:
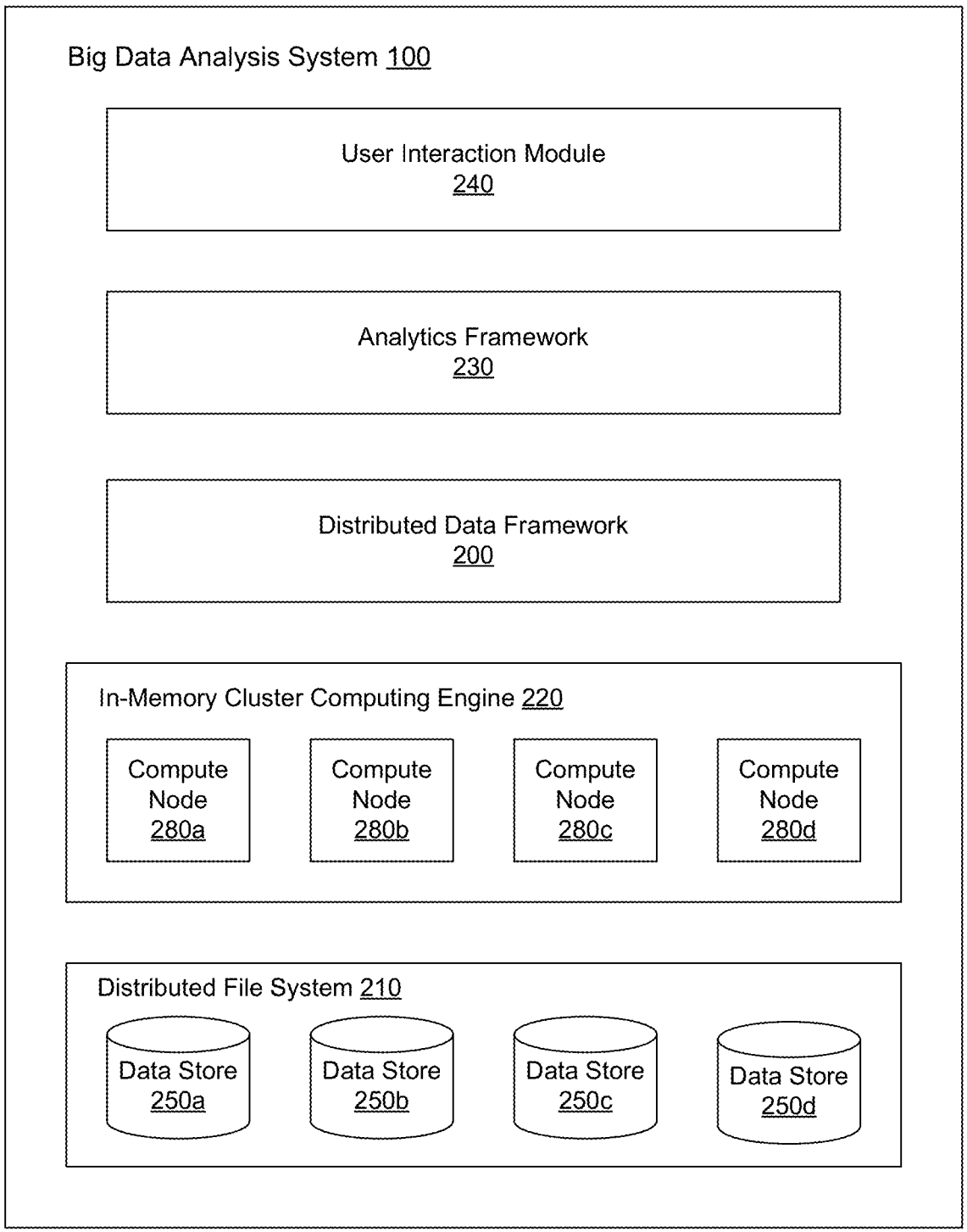
FIG. 2 shows the system architecture of a big data analysis system, in accordance with an embodiment.

FIG. 2 shows the system architecture of a big data analysis system, in accordance with an embodiment. A big data analysis system 100 comprises a distributed file system 210, an in-memory cluster computing engine 220, a distributed data framework 200, an analytics framework 230, and a user interaction module 240. The big data analysis system 100 may include additional or less modules than those shown in FIG. 2. Furthermore, specific functionality may be implemented by modules other than those described herein.

The distributed file system 210 includes multiple data stores 250. These data stores 250 may execute on different computers. In an embodiment, the distributed file system 210 stores large data files that may store gigabytes or terabytes of data. The data files may be distributed across multiple computer systems. In an embodiment, the distributed file system 210 replicates the data for high availability. Typically, the distributed file system 210 processes immutable files to which writes are not performed. An example of a distributed file system is HADOOP distributed file system (HDFS).

The in-memory cluster computing engine 220 loads data from the distributed file system 210 into a cluster of compute nodes 280. Each compute node 280 includes one or more processors and memory for storing data. The in-memory cluster computing engine 220 stores data in-memory for fast access and fast processing. For example, the distributed data framework 200 may receive repeated queries for processing the same distributed data structure stored in the in-memory cluster computing engine 220. The distributed data framework 200 can process the queries efficiently by reusing the distributed data structure stored in the in-memory cluster computing engine 220 without having to load the data from the file system. An example of an in-memory cluster computing engine is the APACHE SPARK system.

The distributed data framework 200 provides an abstraction that allows the modules interacting with the distributed data framework 200 to treat the underlying data provided by the distributed file system 210 or the in-memory cluster computing engine 220 as structured data comprising tables. The distributed data framework 200 supports an application programming interface (API) that allows a caller to treat the underlying data as tables. For example, a software module can interact with the distributed data framework 200 by invoking APIs supported by the distributed data framework 200.

Furthermore, the interface provided by the distributed data framework 200 is independent of the underlying system. In other words, the distributed data framework 200 may be provided using different implementations of in-memory cluster computing engines 220 (or different distributed file systems 210) that are provided by different vendors and support different types of interfaces. However, the interface provided by the distributed data framework 200 is the same for different underlying systems.

In an embodiment, the distributed data framework 200 provides a table based interface for interacting with the distributed data structures. The table based interface The table based structure allows users familiar with database technology to process data stored in the in-memory cluster computing engine 220. The table based distributed data structure provided by the distributed data framework is referred to as distributed data-frame (DDF). The data stored in the in-memory cluster computing engine 220 may be obtained from data files stored in the distributed file system 210, for example, log files generated by computer systems of an enterprise.

The distributed data framework 200 processes large amount of data using the in-memory cluster computing engine 220, for example, materialization and transformation of large distributed data structures. The distributed data framework 200 performs computations that generate smaller size data, for example, aggregation or summarization results and provides these results to a caller of the distributed data framework 200. The caller of the distributed data framework 200 is typically a machine that is not capable of handling large distributed data structures. For example, a client device 130 may receive the smaller size data generated by the distributed data framework 200 and perform visualization of the data or presentation of data via different types of user interfaces. Accordingly the distributed data framework 200 hides the complexity of large distributed data structures and provides an interface that is based on manipulation of small data structures, for example, database tables.

In an embodiment, the distributed data framework 200 supports SQL (structured query language) queries, data table filtering, projections, group by, and join operations based on distributed data-frames. The distributed data framework 200 provides transparent handling of missing data, APIs for transformation of data, and APIs providing machine-learning features based on distributed data-frames. Examples disclosed herein may use SQL syntax for illustration. However, any other type of query language may be used instead of SQL. Accordingly, various clauses of the SQL statements may be replaced with corresponding clauses in the target query language. For example, a SELECT clause of SQL statement may be replaced by the corresponding clause that selects the attributes of a dataset, a WHERE clause of an SQL statement may be replaced by a corresponding clause that filters the records or rows of a dataset processed by a statement of the query language.

The analytics framework 230 supports higher level operations based on the table abstraction provided by the distributed data framework 200. For example, the analytics framework 230 supports collaboration using the distributed data structures represented within the in-memory cluster computing engine 220. The analytics framework 230 supports naming of distributed data structures to facilitate collaboration between users of the big data analysis system 100. In an embodiment, the analytics framework 230 maintains a table mapping user specified names to locations of data structures.

The analytics framework 230 allows computation of statistics describing data represented as a DDF, for example, mean, standard deviation, variance, count, minimum value, maximum value, and so on. The analytics framework 230 also determines multivariate statistics for a DDF including correlation and contingency tables. Furthermore, analytics framework 230 allows grouping of DDF data and merging of two or more DDFs.

The user interaction module 240 allows a user to interact with the big data analysis system using natural language queries. The user interaction module 240 may provide a user interface to a user via a web browser or via some custom client applications. The user interaction module 240 receives natural language queries provided by users. The user interaction module 240 analyzes the queries to generate an execution plan for the natural language query. The execution plan comprises API (application programming interface) calls to the analytics framework 230 and the distributed data framework 200. The user interaction module 240 executes the natural language queries to generate the requested data and provides the result to the user. The user interaction module 240 may present the results of execution of a natural language query as textual data or as a chart.

System Architecture of Natural Language Interface

Figure 3:
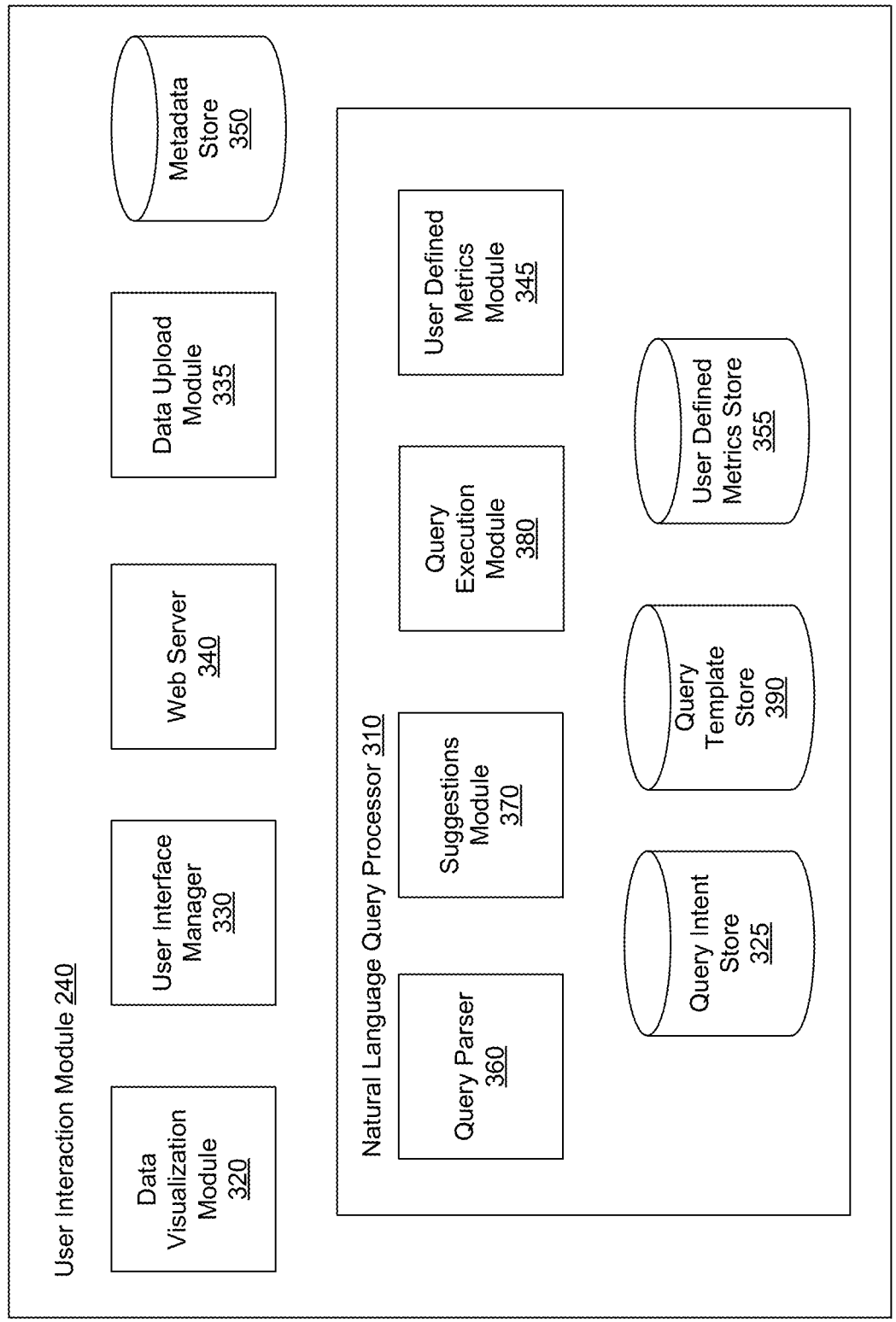
FIG. 3 shows the system architecture of a user interaction module for providing a natural language query interface for users to perform data analysis, according to an embodiment.

FIG. 3 shows the system architecture of a user interaction module for providing a natural language query interface for users to perform data analysis, according to an embodiment. The user interaction module 240 includes a user interface manager 330, a data visualization module 320, a web server 340, a data upload module 335, a metadata store 350, and a natural language query processor 310. Other embodiments may include more, less, or different modules than those shown in FIG. 3.

The user interface manager 330 provides user interfaces to users, allowing the users to interact with the big data analysis system 100. For example, the user interface manager 330 provides user interfaces that allow a user to send natural language queries to the big data analysis system 100. The user interface manager 330 also provides user interfaces that allow users to extend the natural language query processor 310 by providing new query templates that are stored in the query template store 390. In an embodiment, the user interface manager 330 generates web pages (for example, hypertext markup language (HTML) pages) based on the type of user interface to be presented. The user interface manager 330 sends the webpages to the user for presentation, for example, via a client application 140 executing on a client device 130.

The data visualization module 320 generates charts for displaying results of queries. The data visualization module 320 analyzes results of a query to determine what type of chart is suitable for rendering certain type of data. Accordingly, the data visualization module 320 renders the appropriate chart and presents it to the user via a user interface. For example, the data visualization module 320 may visualize certain type of data as a pie chart or a bar chart and other type of data as a scatter plot. The data visualization module 320 determines the type of chart suitable for a given result set and renders the appropriate chart for presentation to the user.

The web server 340 allows a client application running on a client device 130 to interact with the big data analysis system 100 using web pages. The web server 340 receives web requests from the client device 130. The web server 340 analyzes the web requests to determine what information is being requested by the user. For example, a client application 140 may send a natural language query to the big data analysis system 100 as a web request. The web server 340 invokes the required module within the user interaction module 240 to process the web request. The web server 340 generates a web page to present the result of the request to the user via the client application 140.

The metadata store 350 stores metadata describing datasets stored in the big data analysis system 100. For example, the metadata store 350 may describe various data sets stored in the big data analysis system 100 as well as various attributes of the data sets. The metadata store 350 stores information describing each attribute, for example, the type of information stored in the attribute such as integer, string, timestamp, and so on.

The data upload module 335 performs upload of data into the big data analysis system 100. The data may be uploaded from files that can be in one of different types of formats, for example, comma separated values, specific formats of log files, and so on. The data upload module 335 sends a data upload user interface via the user interface manager 330 to allow the user to provide information regarding the data. For example, the data upload user interface allows a user to specify the types of various columns of a data set indicating whether the columns store a numeric (integer or decimal) value, string value, date, timestamp, and so on.

The data upload user interface also allows a user to specify if a column is associated with a particular category type. A category type allows the big data analysis system to associate data with a fixed number of categorical values. For example, a column storing age may include values ranging from 0 to 100. However, the values may be divided into a set of categories such as young, adult, middle aged, senior, old, and so on. Each category represents a subset of values that can be occupied by a variable (or stored in a column.) Associating a type of value with a category allows better visualization of data. For example, each category may be associated with a color that is displayed for data points associated with the category.

In an embodiment, the data upload module 335 infers types of data columns by analyzing data values or text strings in the columns. The data upload module 335 may identify patterns in the data values to determine types. For example, data upload module 335 may infer based on the range of values of a column that the column stores timestamps. The data upload module 335 may infer based on pattern of numbers that a column stores social security number (since social security numbers are integers of a particular size with possible separators that occur at specific positions between digits.)

In an embodiment, the data upload module 335 infers types by comparing multiple data values stored in a data column. For example, the data upload module 335 infers types based on distribution of data values stored in a column, whether the column stores continuously variable values, whether the column stores categorical values, ordinal values, identifiers, or free text. The data upload module 335 presents the inferred data types to the user via the data upload user interface. The data upload module 335 receives approval from the user, whether the inferred types are correct or whether the user want to override the inferred type provided by the data upload module 335.

The natural language query processor 310 includes a query parser 360, a suggestion module 370, a query execution module 380, a query intent store 325, a user defined metrics module 345, a user defined metrics store 355, a user defined metrics module 345, a query template store 390, and a user defined metrics store 355. The natural language query processor 310 may include other modules not shown herein. Furthermore, functionality described herein may be performed by modules different from those indicated herein.

The query parser 360 parses natural language queries received from the user. The query parser 360 parses partial queries received from the user. The query parser builds a data structure to represent various elements of a partial natural language query received from user. In an embodiment, the query parser 360 builds an ordered tree structure, for example, a trie data structure.

In an embodiment, the query parser 360 parses a query string based on a query template. The query parser 360 parses query extensions, for example, a query filter clause or a pivot clause. The query extension may be in the beginning of the query or at the end of the query. For example, the query "when month is July, show relationship between . . . " includes a query extension (a query filter clause) "when the month is July" in the beginning of the query. Similarly, the query "show top product by revenue in August" includes a query filter clause "in August" in the end. A query template specifies the position of a query extension in queries conforming to the query template.

The query parser 360 further parses fixed words and phrases. These include prefixes, for example, "show relationship", "forecast", and so on; conjunctions, for example, "and", "or", "between" and so on; and parameters, for example, "daily", "weekly", "monthly", and so on. The query parser 360 parses data attributes in the query. In some embodiments, the query template specifies certain types of specific attributes. For example, a query template for queries of the form "show top C by X" specifies that C is categorical attribute and X is numeric or a user-defined metric/attribute.

In an embodiment, the query parser 360 performs fuzzy parse of the query based on approximate string match. The query parser 360 uses a phonetic string matching process, for example, double metaphone process. The user interaction module 240 may receive a query string generated by a speech recognition engine. The query parser 360 uses the phonetic string matching process for the query string generated by the speech recognition engine. This is so because the output of speech recognition may not be accurate for variables since the variable names may not be English words and may not have standard pronunciations.

In an embodiment, the query parser 360 receives keywords with typos and replaces them with the correct keyword. In an embodiment, the query parser 360 uses a string edit distance between keywords of query string and keywords associated with query template to find the correct keyword. If the query parser 360 determines that a string edit distance between a keyword of a query and a keyword expected based on the query template is within a threshold, the query parser 360 replaces the keyword of the query with the correct keyword based on the query template.

The query template store 390 stores query templates describing various types of natural language queries that the natural language query processor 310 can process. Each query template comprises one or more terms or phrases as well as attributes representing information in a data set. An attribute may represent a numeric value, a string value, a category value, a metric, or any other type of information. An attribute may refer to a column of the data set. For example, a data set representing information about flights may include a column storing flight identifiers, flight timings, whether the flight was late, and so on. These columns may be specified as inputs to a natural language query. The query template stores relationships between the terms/phrases and the attributes. The relationship indicates an order between the various terms/phrases and attributes. For example, the template may indicate that the query starts with a phrase X, followed by a name of an attribute, further followed by a phrase Y. More specifically, an example query template indicates that a phrase "show me the relationship between" is followed by an attribute, followed by keyword "and", further followed by another attribute. The natural language query processor 310 can match queries such as "show me the relation between arrival_delay and airport" against this query template.

The suggestions module 370 receives a partial natural language query as input and generates suggestions for terms that can potentially occur after the partial natural language query or suggestions of query strings that include more information than the input query string. The partial natural language query may be a substring of a natural language query being specified by the user. The suggestion module 370 compares the terms of the query string input by the user with templates stored in the query template store 390. The suggestion module 370 compares the terms of the query string with terms of the query templates in the order in which the terms occur in the template. The suggestion module 370 determines whether the input query string is a prefix of a natural language query based on a matching of the input query string with the query templates and identifies terms that can potentially follow the prefix of the natural language query as determined by the query templates. Alternatively, the suggestion module 370 replaces the query string with a longer query string or a query string specifying more information compared to the input query string based on query templates that match the input query string.

Each query template is associated with a query intent. The query intent determines the processing performed by the natural language query processor 310 in response to natural language queries based on that query template. The query intent store 325 stores information describing various query intents that can be used by natural language queries processed by the natural language query processor 310. A query intent may be identified by a value that can be enumerated, for example, an integer or a string value. Each query template stored in the query template store 390 is associated with a query intent. A query intent may require specification of one or more attributes (or columns) of a dataset. The query intent store 325 also stores program code (or instructions) for executing natural language queries having a particular query intent. The program code associated with a query intent invokes APIs of analytics framework 230 or distributed data framework 200.

An example of query intent is "relationship" between columns. A query associated with "relationship" intent indicates that the user is requesting information describing relationships between two or more columns. Accordingly, the natural language query processor 310 performs analysis of the specified columns in the query. For example, if the natural language query processor 310 receives a query requesting relationship between two columns, the natural language query processor 310 invokes code that may sample data of the two columns and generates a chart that shows the relationship between the two columns.

Example queries based on query intent "relationship" are "show relationship between arrival_delay and arrival_time" that indicates that the user is requesting information describing arrival delay and arrival time for a dataset storing or flight information for airlines. Another example query for the dataset storing flight information is "describe relationship between arrival_delay and unique_carrier." Another type of query having relationship intent is "relate A to B."

Various embodiments of query templates processed by the natural language query processor 310 use different query intents, for example, show relationships, find top n rows or categories by a numeric measure or KPI, view first n rows, view random samples, show distribution of a column, forecast a numeric column or KPI, compute statistics of a column, compute the value of a KPI, show overall summary of all columns, show summary of a column, count number of rows or unique values in a column by a categorical group, plot co-occurrence heat map of two categorical variables, plot density heat map of a numeric variable by two categorical variables, show geospatial distribution of a numeric column or user defined metric by geographic features (state/county/zipcode, etc.), show geospatial density of individual data samples, show a numeric column or user defined metric over time (with different granularity: annually, quarterly, . . . ), compare two numeric columns or user defined metrics over time (with different granularity: annually, quarterly, . . . ), compute trend line of one column by another column, find top predictors of a variable and their effects size, and find top segments of data that best predict another column (propensity to buy/churn, etc.)

The analysis performed by the natural language query processor 310 may depend on the type of data stored in the columns, for example, a different analysis may be performed if a column stores numeric data as compared to string data or timestamps. For example, while determining relationship between two columns, the natural language query processor 310 determines the type of charts to use for visualizing the relationship based on the type of data of the two columns. The natural language query processor 310 may use a particular type of chart if one or both columns stored data that can be considered a category. The natural language query processor 310 may use another type of chart if none of the columns stored data that can be considered a category. Similarly, natural language query processor 310 may determine the type of chart based on whether one of the columns represents time.

The same query intent may be associated with a plurality of natural language query templates. Each natural language query templates may specify the same query intent in a different may using a different set of natural language keywords or a different arrangement of attributes and keywords. A query intent is associated with a set of attributes. For example, a comparison query intent requires a first attribute and a second attribute. Similarly a relationship query intent also requires a first attribute and a second attribute. The plurality of natural language query templates associated with a query intent all use the same set of attributes but different natural language keywords. This is so because in natural language, the same request can be made in multiple ways.

Another example of query intent is "comparison" between two attributes, for example, columns of datasets. Typically a query having a "comparison" specifies two (or more) columns and requests information comparing the two columns. An example of a query with query intent "comparison" is "compare arrival_delay with arrival_time." This query indicates that the user is requesting information comparing arrival delay and arrival time for the airlines dataset. Another example of a query with query intent "comparison" is "compare AA and DL in terms of arrival_delay" where AA and DL are two columns of the airlines dataset. Other examples of queries with query intent "comparison" is "compare arrival_delay with arrival_time over time" (requesting comparison information varying with time) and "compare arrival_delay of AA and DL for last quarter" (specifying a time interval for which the comparison is requested.

A query template may specify one or more of: data attributes (for example, a numeric attribute or a user defined metric), words or phrases, or phrase patterns. A phrase pattern may specify regular expressions, enumerated values, constant values, and so on. For example, a phrase pattern may specify that a particular component of a query based on a query template matches ["daily", "monthly", "annually"]. Accordingly, that component of the query can take any of the values enumerated, for example, "daily", "monthly", or "annually".

In an embodiment, a query template is associated with custom constraint functions. For example, the query template may include a system defined or user defined metric "weekly revenue". The metric is associated with a time interval (weekly). The query template is of the form, "show C for X" where C is a metric and X is a time interval. For example, the system receives a query "show weekly revenue for this year". In this example C="weekly revenue" and X="this year." The query template is associated with a custom constraint that specifies that the time interval associated with X must be larger than the time interval associated with C. The system determines the time intervals for the query components corresponding to C and X and checks if the custom constraint is satisfied. Since components C is associated with a time interval "week" and component X is associated with the time interval "year", the query satisfies the custom constraint since a week is smaller than a year. In contrast, the system determines that the query "show annual revenue for thia week" does not satisfy the custom constraint since the component C (annual revenue) is associated with a "year" and the component X is associated with a time interval "week" and a year is longer than the week.

In general, the query template store 390 stores query templates that may include custom constraints. A custom constraint comprises an expression based on the properties of various components of the query. The expression corresponding to the query template evaluates to a true or false value. The natural language query processor 310 receives a query and checks whether the query matches a query template. The natural language query processor 310 identifies the various components of a query by matching the query with the query template. The natural language query processor 310 evaluates the expression corresponding to the custom constraint associated with the query template. If the custom constraint evaluates to true, the natural language query processor 310 proceeds with execution of the query. If the custom constraint evaluates to false, the natural language query processor 310 returns an error indicating that the query is invalid and cannot be processed.

The query execution module 380 executes a query once the complete query is received from the user. The query execution module 380 invokes the query parser 360 to parse and validate the query. The query execution module 380 identifies the query intent of the input query and checks if all attributes (e.g., columns) required for the intent are specified by the query. The query execution module 380 identifies the program code associated with the intent and executes the program code using the attributes and any relevant information specified by the query. The query execution module 380 provides the results to the data visualization module 320 that generates a visualization based on the result, for example, a chart. The visualization module 320 provides the visualization information to the user interface manager 330 that sends the results and the visualization to the client application 140 for presentation to the user.

The user defined metrics store 355 stores definitions of user defined metrics received from the user. The user defined metrics store 355 associates keywords (or phrases or aliases) that identify specific user defined metrics with the definitions of the user defined metrics. The definition of each user defined metric is stored as expressions specified using a well-defined syntax, for example, syntax of a programming language.

The user defined metrics module 345 receives and processes user defined metrics. The user defined metrics module 345 maps keywords (or phrases) to expressions defining each user defined metric. The user defined metrics module 345 is invoked by the natural language query processor 310 for processing natural language queries based on user defined metrics. The user defined metrics module 345 provides a representation of the user defined metric to the natural language query processor 310 for generating underlying queries for processing the data of the dataset based on the intent of the natural language query. For example, if the user defined metric performs an aggregation, the user defined metrics module 345 determines the expression that specifies the aggregation operation. The natural language query processor 310 generates the underlying dataset query for performing the aggregate operation, for example, an SQL (structured query language) query. The query execution module 380 executes the underlying dataset queries to generate the result set based on the natural language query.

Interactive Process for Building Natural Language Query

FIGS. 4A-4E show screenshots of a user interface illustrating the process of iteratively defining a natural language query for big data analysis, according to an embodiment. The screenshots show how an example query is iteratively defined via interactions between the user and the user interaction module 240. The suggestions module 370 of the natural language query processor 310 receives a substring of a natural language query (for example, a prefix or any portion of the natural language query) from the user via the user interface of client application 140. The suggestions module 370 determines alternative suggestions for the user and presents these suggestions to the user. The suggestions module 370 does not necessarily provide suggestions that complete the full query since there can be a very large number of ways to complete a natural language query. Even though the suggestions module 370 could determine all possible ways to complete the natural language queries, presenting such a large number of suggestions provides poor user experience since the user has to scroll thorough a very large number of options to arrive at the desired result. Therefore, the suggestions module 370 determines one or more terms that form a portion of various alternatives for completing the remaining natural language query. Accordingly, the suggestions module 370 helps the user incrementally build the natural language query based on incremental suggestions presented to the user.

Figure 4A:
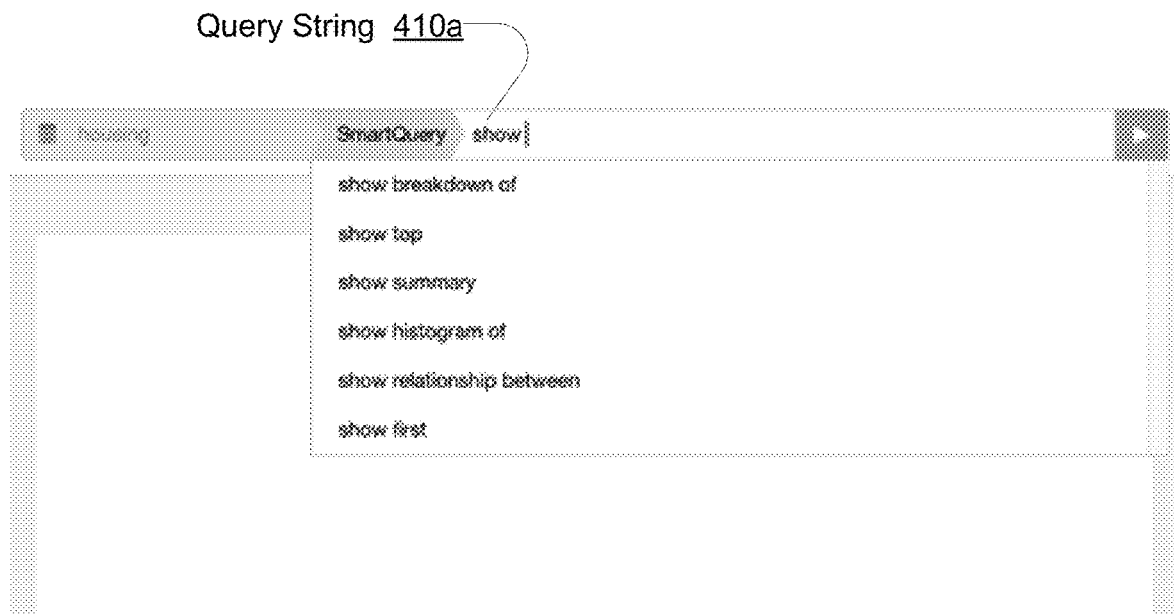

As shown in FIG. 4A, the client application 140 receives the prefix 410a having a single keyword "show". The suggestions module 370 identifies a few keywords of natural language queries that can be presented to the user as alternative suggestions for completing the natural language query. The suggestions module provides these suggestions to the user via the client application 140. For example, as shown in FIG. 4A, the terms "breakdown of", "top", "summary", "histogram of" and so on are presented to the user as alternative suggestions for continuing to build the query.

Figure 4B:
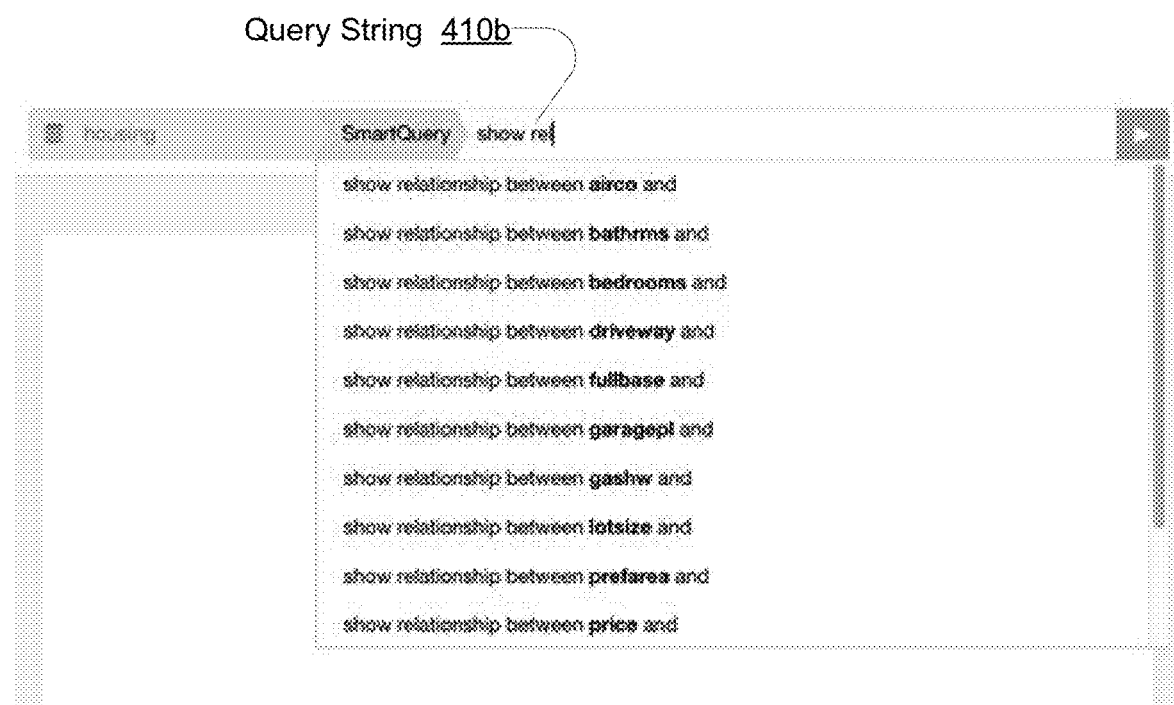

The user may select one of the suggestions or add one or more terms manually. In other words, the suggestions module 370 receives a selection of the suggestions presented to the user or a manually entered prefix of the natural language query that is longer than the prefix previously received. As shown in FIG. 4B, the user continues manually entering the query terms. Accordingly, the suggestions module 370 receives the query prefix 410b "show re". The suggestions module 370 matches the prefix 410b against query templates to determine that the only query template that can be used to complete the query is the template for showing a relationship between two attributes (or columns of a dataset.) The suggestions module determines that adding two new keywords to the input prefix (i.e., "relationship" and "between") results in a single alternative suggestion for the user.

The suggestions module 370 determines that a single alternative is below a low threshold number of alternatives that should preferably be presented to the user. Accordingly, the suggestions module 370 continues to determine additional terms that can be suggested. Based on the query template for showing relationship, the suggestions module 370 determines that the next term is an expression. However, the suggestions module 370 determines that the number of alternatives of the full expression is too large for presentation as suggestions (i.e., more than a high threshold.) Accordingly, the suggestions module 370 selects a portion of the expression to suggest, i.e., a single operand of the expression. The first term of the expression (i.e., an operand) can be a column of the dataset being processed. Accordingly, the suggestions module 370 identifies all columns that can be presented as suggestion based on the query template definition. Furthermore, the suggestions module 370 determines that the only operator for the expression applicable to this query is "and" and accordingly adds it to the suggestions (since adding the operator does not cause the number of alternatives to exceed a high threshold.) As shown in FIG. 4B, the suggestions module 370 presents suggestions of the form "show relationship between" followed by a column name, further followed by keyword "and."

Figure 4C:
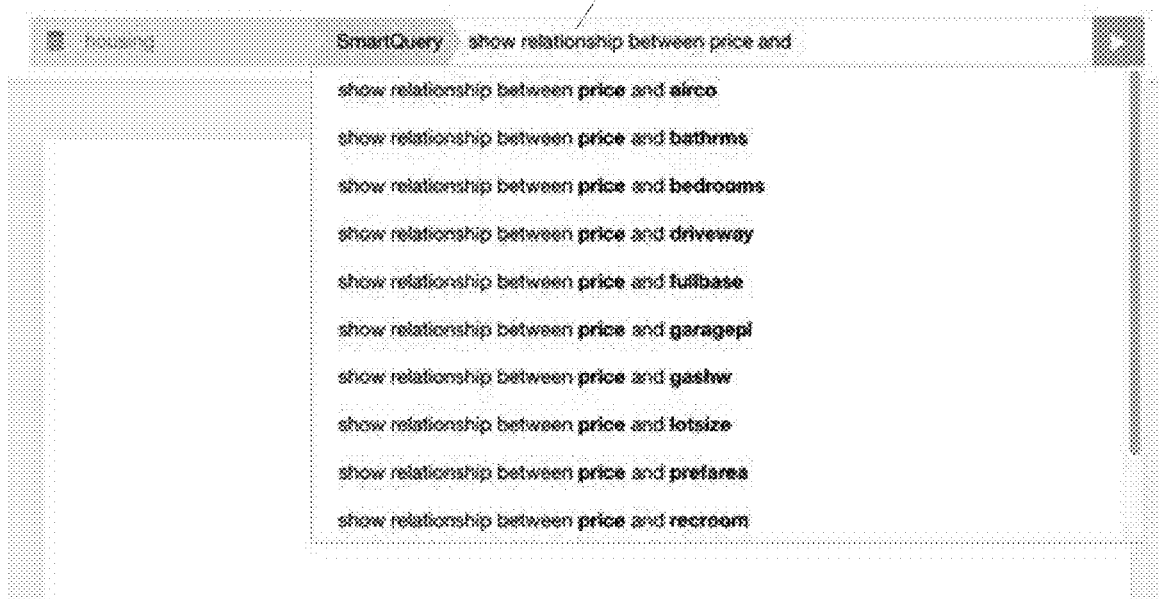

As shown in FIG. 4C, the user selects one of the suggestions from FIG. 4B, i.e., the suggestion "show relationship between price and." The suggestions module 370 receives the new prefix 410c (which is larger than the previous prefixes received, i.e., prefixes 410a and 410b.) The suggestions module 370 determines based on the matching query template that the next term (or terms) to be suggested is an operand. The suggestions module 370 suggests various columns that can be used to build the expression and continue building the natural language query.

If the suggestions module 370 determines that the next term that can occur after a given prefix based on one or more matching natural language query templates is an operand, the suggestions module 370 identifies all column names of the dataset that can be used as the operand for the given context in the natural language query. If the user enters a part of the name of the operand the suggestions module 370 identifies all the operands that begin with the string and suggests them. For example, if the user enters a string "arr" as the prefix of the operand, the suggestions module 370 identifies operands having names of the format "arr*", i.e., names having "an" as the prefix. The suggestions module 370 may perform a search over all column names of the datasets being queried to identify names of the form "arr*". The suggestions module 370 prepares alternative suggestions to present to the user based on the identified column names. The suggestions module 370 prepares prefixes for potential natural language queries that are longer than the prefix entered by the user and presents them to the user.

Figure 4D:
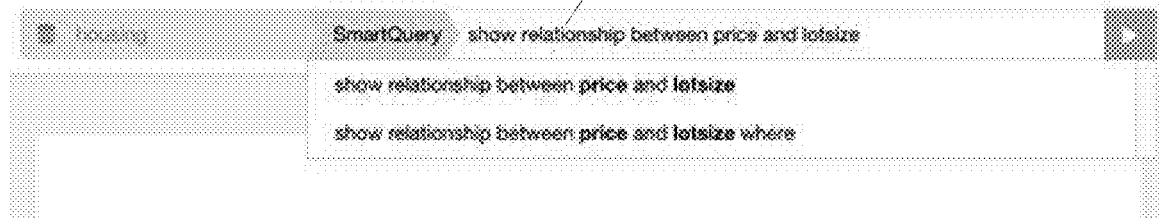

FIG. 4D shows that the user selected an alternative suggested in FIG. 4C. Accordingly, the next prefix 410d received by the suggestions module 370 is "show relationship between price and lotsize." The suggestions module 370 determines that this is a full natural language query that the user may be interested in providing. However, based on the matching query template, the suggestions module 370 determines that user could continue providing additional keywords. Accordingly, the suggestions module 370 provides two suggestions, the current input prefix itself as a natural language query and an additional keyword "where" that the user can provide to continue building the natural language query.

Figure 4E:
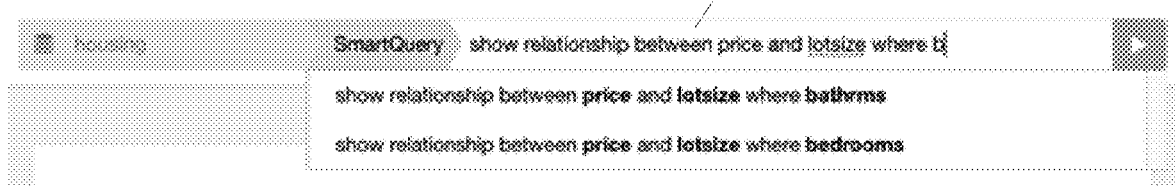

FIG. 4E shows that the user selected the alternative "show relationship between price and lotsize where", thereby indicating that the user wants to continue building the natural language query. The suggestions module 370 determines based on the matching natural language query template that the prefix provided by the user is followed by another expression. Accordingly, the suggestions module 370 provides suggestions for the first operand of the expression. The suggestions module 370 determines that the user further provided the term "b" as the prefix for the operand. Accordingly, the suggestions module 370 limits the suggestions to all columns that have "b" as a prefix, i.e., bathrms and bedrooms.

Figure 4F:
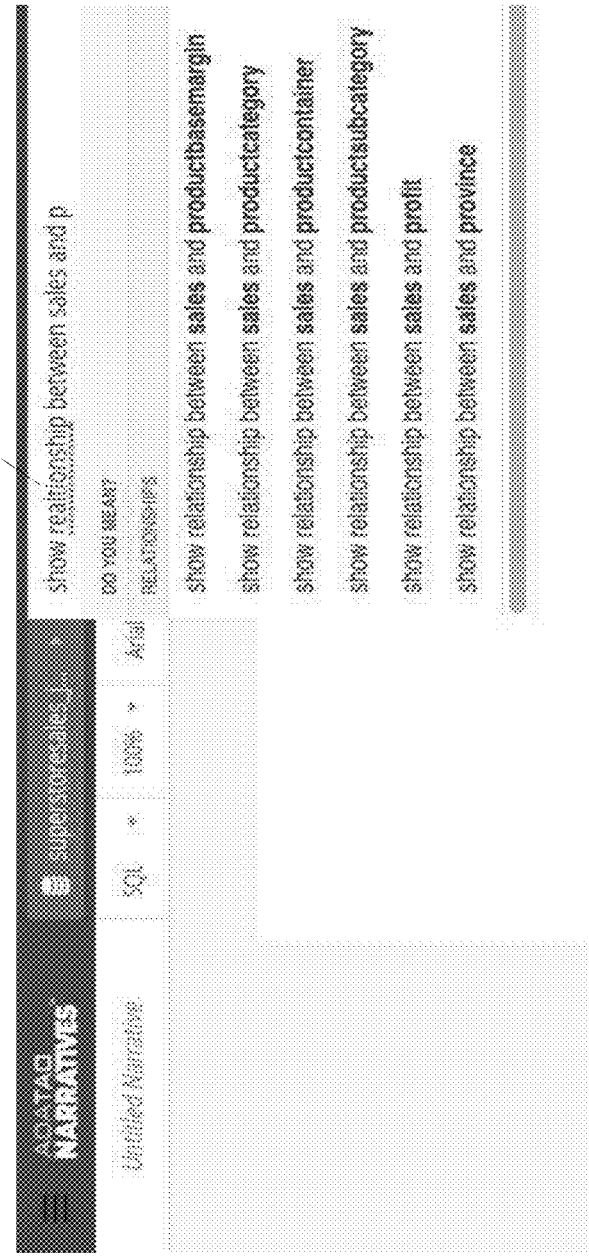

FIG. 4F shows the user interface of the user interaction module 240 receiving a query with a typo in it. As shown in the figure the query includes a typo in the keyword "relationship". The natural language query processor 310 matches the keyword with typo with keywords based on the query templates using a string edit distance and identifies suggestions based on the matching.

Figure 4G:
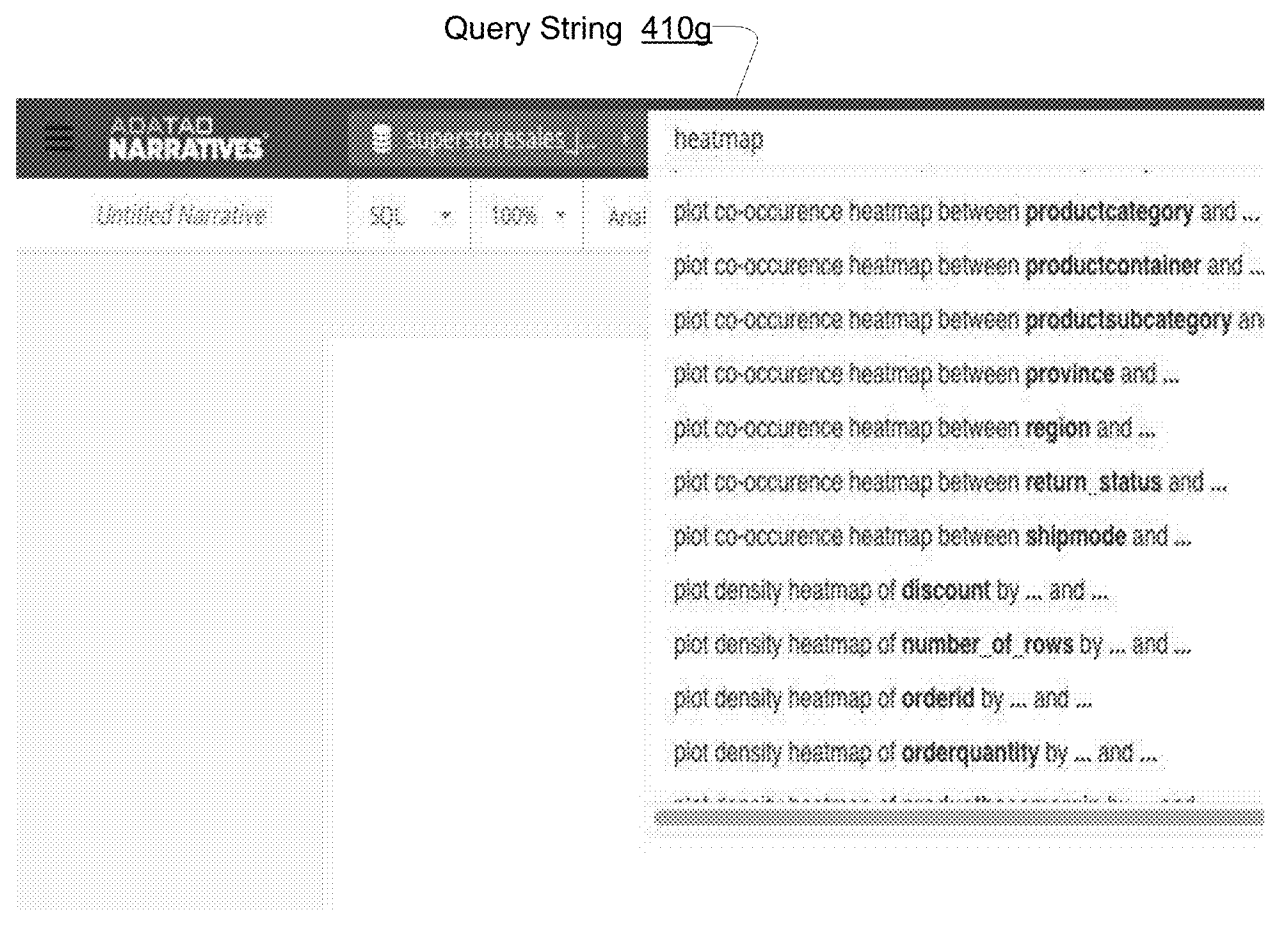

FIG. 4G illustrates that the query string 410g received by the user interface of the user interaction module 240 can be a substring of the final natural language query or any query string associated with the final natural language query. Accordingly, user interaction module 240 determines whether the string 410g is be a prefix of the natural language query, a suffix of the natural language query, any portion occurring within the natural language query, or a query string that is semantically equivalent to a substring of the natural language query and can be replaced with the substring.

FIG. 4H illustrates that the suggestions presented by the natural language query processor 310 are determined based on the query templates that semantically match the query string 410h being received. Accordingly, the query string may not even be a part of the suggestions or a part of the final natural language query that is suggested.

Figure 4I:
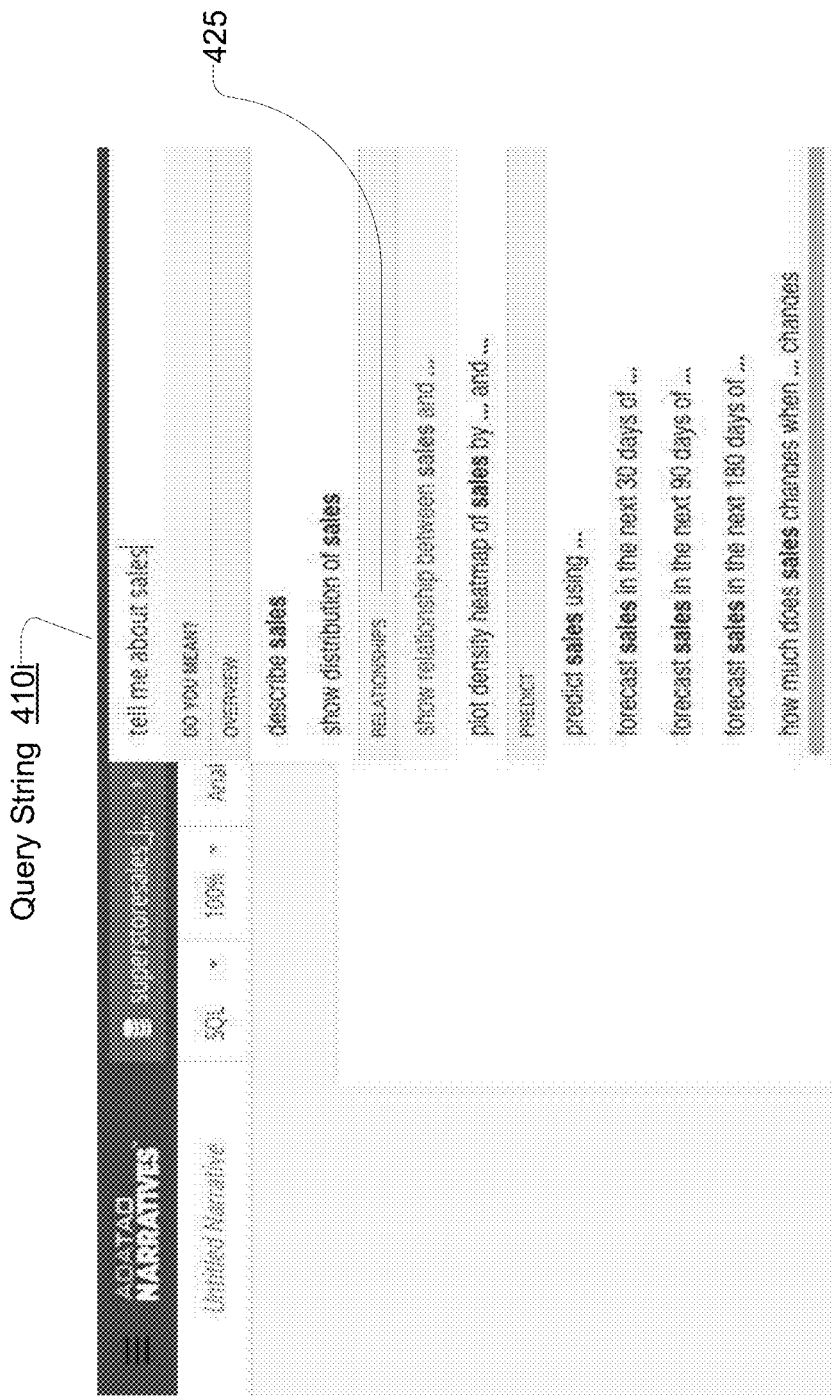

FIG. 4I shows the user interface of the user interaction module 240 receiving a query string 410i and presenting suggestions based on multiple query templates. The user interaction module 240 presents the suggestions categorized by the query templates used for the suggestion. The user interaction module 240 groups the suggestions and presents each group with information 425 describing the category. In an embodiment, the user interaction module 240 associates each query template with a description and presents the description of the matching query template as the information 425 describing a category of suggestions.

Figure 5:
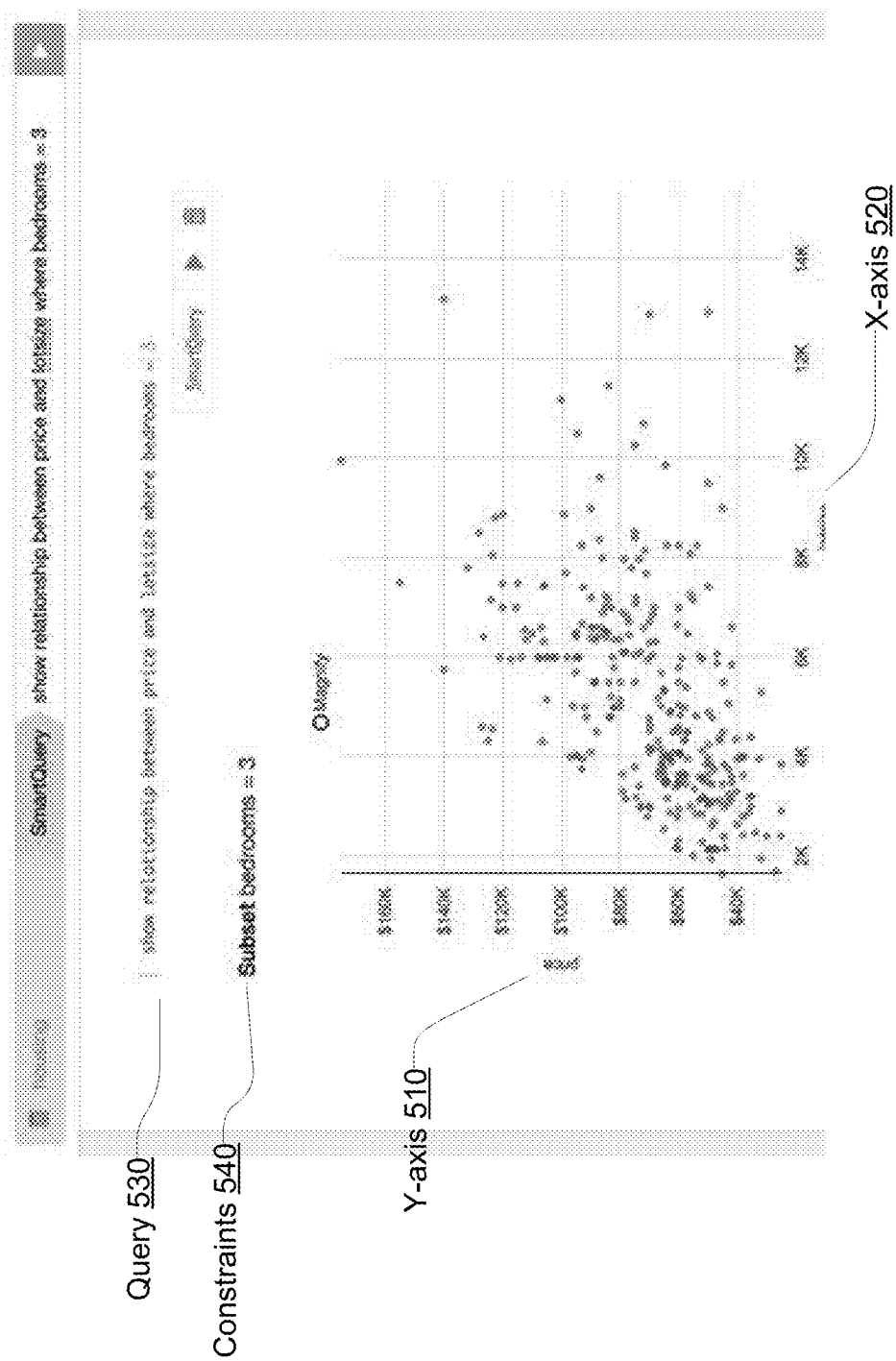
FIG. 5 show a screenshot of a user interface illustrating the result of execution of a natural language query for big data analysis defined in FIGS. 4A-4E, according to an embodiment.

The user is assumed to complete the query as "show relationship between price and lotsize where bedrooms=3". FIG. 5 show a screenshot of a user interface illustrating the result of execution of a natural language query for big data analysis defined in FIGS. 4A-4E, according to an embodiment. The data visualization module 320 determines the type of visualization that is relevant to the natural language query input by the user. Accordingly, the data visualization module 320 selects a scatter plot for displaying the results. The user interface manager renders the chart and sends for display to the user via the client application 140 of the client device 130.

As shown in FIG. 5, the data visualization module 320 selects the price along the Y-axis 510 plotted against the lotsize displayed against the X-axis 520. The data visualization module 320 also includes the query 530 along with the chart for display. The data visualization module 320 identifies certain portions of the natural language query as information describing the data set being displayed. For example, the condition following the "where" keyword is identified as the filter clause that is displayed as constraints 540 associated with the data set displayed.

Figure 6:
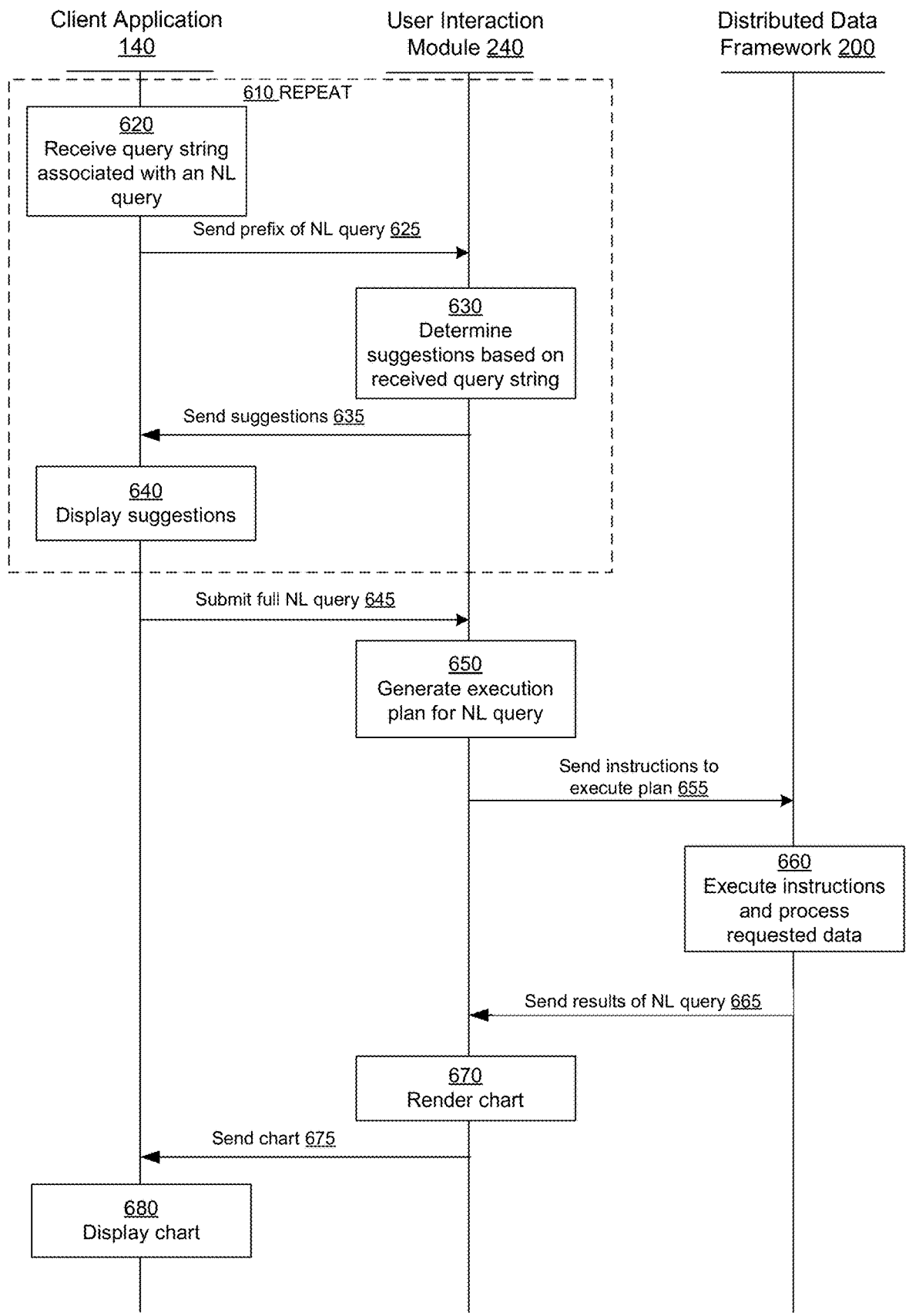
FIG. 6 illustrates the interactions between a client application, a user interaction module, and the distributed data framework module to execute natural language queries, according to an embodiment of the invention.

FIG. 6 illustrates the interactions between a client application, a user interaction module, and the distributed data framework module to execute natural language queries, according to an embodiment of the invention. Various steps indicated in FIG. 6 may be performed by modules different from those indicated in the description herein. Furthermore, certain steps may be performed in an order different from the order indicated in FIG. 6.

The client application 140 interacts with a user via a user interface that receives 620 input provided by the user and presents results based on input provided by the user. The client application 140 displays a query user interface that allows the user to input a natural language query for performing big data analysis. The query user interface receives

620 a portion of a natural language query from the user. The portion of natural language query received by the query user interface is a query string associated with a natural language query or a substring of a full natural language query that the user intends to provide as input. In an embodiment, the query string received by the query user interface may not be part of the final natural language query or the suggestions presented by the query user interface to the user. The natural language query processor determines the suggestions or the final natural language query based on the query string received by the query user interface.

A natural language query comprises a sequence of terms provided by a user. For example, a natural language query may specify "show me the relationship between A and B." The natural language query user interface starts receiving the natural language (NL) query by first receiving the prefix "show." Next, the natural language query UI receives the prefix "show me," followed by the prefix "show me the," followed by "show me the relationship," and so on.

The client application 140 sends 625 the query string associated with the natural language query received to the user interaction module 240. The user interaction module 240 determines 630 suggestions of one or more terms for the received query string. The details of how the user interaction module 240 determines 630 the suggestions of terms are further described herein, for example, in FIGS. 7 and 8. The user interaction module 240 sends 635 the determined suggestions to the client application 140 for display. The client application 140 displays the suggestions to the user. The client application 140 may receive an indication of a selection of a suggestion from the user. Alternatively, the client application 140 may receive 620 one or more new terms entered by the user instead of the suggestions provided by the user interaction module 240. The terms corresponding to a selected suggestion or the new terms received from the user are added to the prefix of the natural language query to form a longer prefix of the natural language query. Alternatively a suggestion representing a larger query string or a different query string may be selected and presented.

The interactions formed by steps 620, 625, 630, 635, and 640 may be repeated 610 multiple times until the natural language query is completed. The client application 140 receives from the user, an indication that the natural language query is complete. For example, the user may indicate that the natural language query is complete by clicking on a submit button. Accordingly, the client application 140 submits 645 the full natural language query to the user interaction module 240.

The user interface module 240 receives the natural language query from the client application 140. The user interface module 240 generates 650 an execution plan for executing the natural language query. In an embodiment, the execution plan comprises calls to one or more APIs (application programming interface) of the analytics framework 230 and/or distributed data framework 200. The analytics framework 230 may further translate the calls to APIs of the analytics framework 230 to calls to APIs of the distributed data framework 200. The user interaction module 240 sends 655 instructions corresponding to the natural language query to the distributed data framework 200 (and/or the analytics framework 230).

The distributed data framework 200 and/or the analytics framework 230 execute the received instructions and process the data as requested by the natural language query. The distributed data framework 200 sends requests for processing of the instructions to the in-memory cluster computing engine 220. The distributed data framework 200 determines the result of the natural language query and sends 665 the results to the user interaction module 240.

The user interaction module 240 renders 670 a chart based on the results received from the distributed data framework 200. In an embodiment, the user interaction module 240 determines the type of chart to be rendered based on the intent of the natural language query, types of columns processed by the natural language query, and the result set received. The user interaction module 240 sends 675 the rendered chart to the client application 140 for display. The client application 140 displays the chart to the user via the display of the client device 130.

Figure 7:
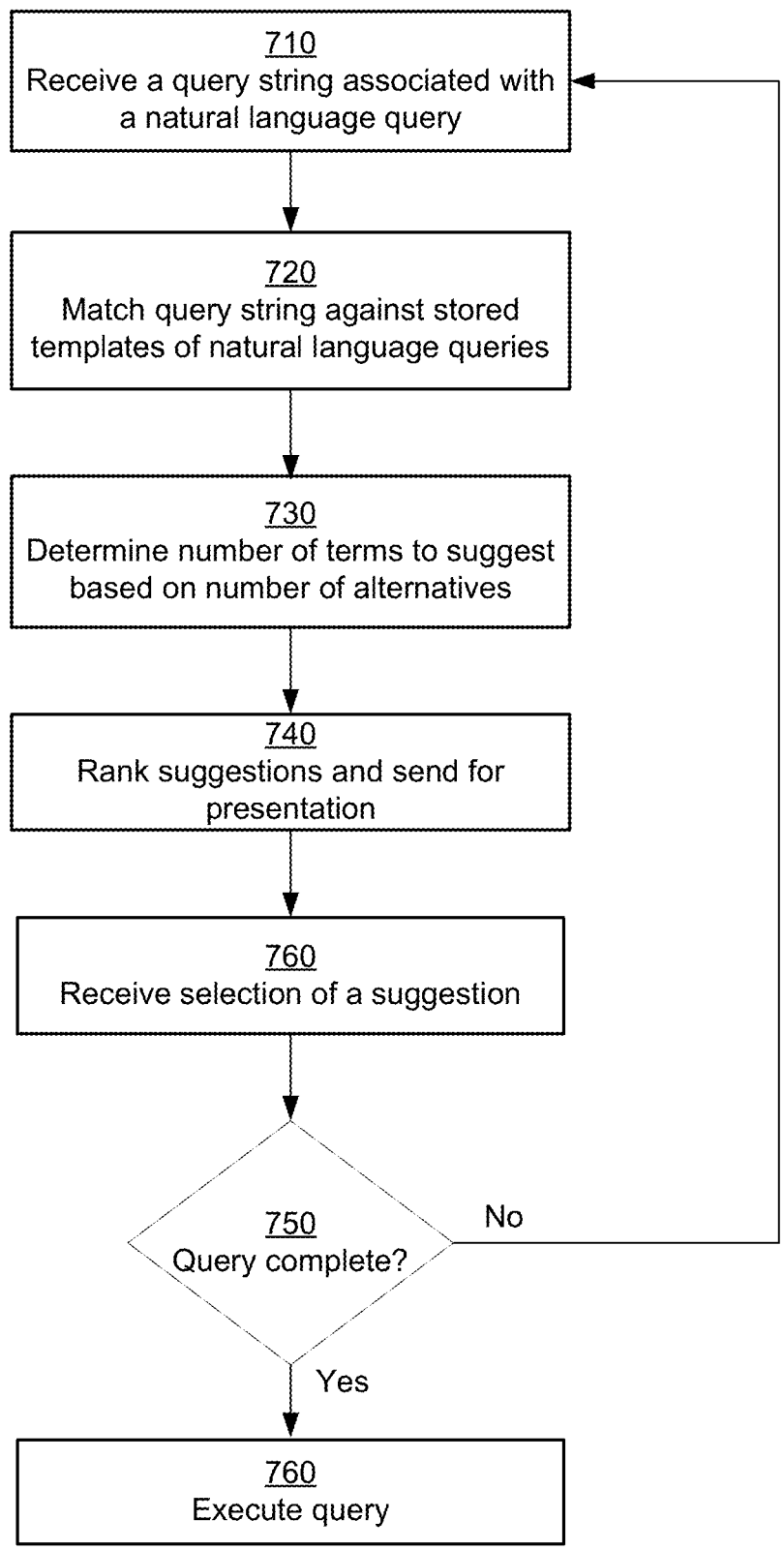
FIG. 7 illustrates the process of identifying suggestions for completion of a natural language query, according to an embodiment of the invention.

The details of the process used for determining 630 the suggestions of terms for completing a natural language query are further described herein. FIG. 7 illustrates the process of identifying suggestions for completion of a natural language query, according to an embodiment of the invention. The user interaction module 240 receives 710 an input prefix of a natural language query from the client application 140. This step is similar to step 620 of FIG. 6.

The suggestion module 370 matches 720 the input query string against templates of natural language queries stored in the query template store 390. The suggestion module 370 identifies terms of the input query string and matches the terms of query templates in the order in which the terms occur in the natural language query and the order in which the query template expects the terms. If certain term of a received query string comprises a name of a column of the dataset, and the corresponding term in the query template expects an attribute, the suggestion module 370 considers the two terms to match. Typically a query template includes generic terms that match specific types of terms of natural language queries. For example, the query template may specify that a term can be an attribute or a user defined metric. If the corresponding term of a query string is a user defined term called revenue, the two terms are determined to match.

The user interaction module 240 determines the terms to be suggested in response to the received query string. The suggestions do not necessarily complete the natural language query. Instead the suggestions allow the user to increase the size of the query string by adding one or more terms. Accordingly, the user may generate larger and larger prefixes by using the suggestions until the natural language query is completed. A suggestion represents one or more terms that form a portion of a sequence of terms that can be used for completing the natural language query. In other words, a suggestion is a portion of an alternative for the remaining natural language query.

The suggestion module 370 determines 730 the number of terms to suggest based on the total number of alternatives. For example, if the suggestion module 370 selects a single term to suggest, the number of alternative suggestions may be n1. If the suggestion module 370 selects two terms to suggest, the number of alternative suggestions may be n2. The value of n2 is greater than n1 since the number of alternatives for two terms includes all the n1 alternatives of single terms with possibly multiple combinations for each single term. For example, if the prefix natural language query is "show me the relationship," the suggestion module 370 may select a single term "between" as a suggestion. However, if the suggestion module 370 selects two terms, the number of combinations of two terms can be many, for example, "between X," "between Y," "between Z," and so on. Accordingly, each single term may be associated with multiple values of the second term. Similarly, if the suggestion module 370 selects three terms to suggest, the number of alternative suggestions based on 3 terms is n3 that is greater than n1.

The suggestion module 370 selects a number of terms based on the number of alternative suggestions based on the number of terms. More specifically, the suggestion module 370 selects a number of terms that results in alternative suggestions that are not too few and not too many. In other words, if possible, the suggestion module 370 selects a number of terms that results in a number of alternatives that are more than a low threshold value and less than a high threshold value. For example, the low threshold value may be 4 and the high threshold value may be 20. The suggestion module 370 selects fewer than the high threshold value because presenting more alternatives provides a poor user experience. The suggestion module 370 maintains a low threshold value since presenting very few alternatives makes the overall process of iteratively defining the natural language query slow. Accordingly, if possible, the suggestion module 370 presents the user with more terms, thereby allowing the user to define the natural language query faster.

As an example, if the suggestion module 370 presents 50 alternatives (or any large number of alternatives) to the user, the user needs to scroll through a very large number of values to identify a suggestion and also the large number of value may not display properly on the screen. In an embodiment, the suggestion module 370 selects the value of the low threshold and high threshold based on the type of client device 130 on which the suggestions are being displayed. For example, the suggestion module 370 may select smaller values of high threshold for small screen devices such as smartphones and larger values of high threshold for large screen devices such as desktop machines.

The suggestion module 370 ranks 740 the suggestions for presentation to the user. In an embodiment, the suggestion module 370 ranks the suggestions in an alphabetic order. The suggestion module 370 may rank suggestions based on other criteria, for example, based on historical data indicating which suggestions are more likely to be selected by a user. The suggestion module 370 may use historical data based on a specific user that is currently interacting with the system or based on historical data of a large number of users of the system.

The suggestion module 370 sends 740 the ranked alternatives to the user interface manager 330 for presentation to the user via the client application 140. The user interface manager 330 sends the alternatives to the client device 130 for presentation via the client application 140.

The user interface manager 330 receives 760 the selection of one of the alternatives presented to the user. For example, the user may scroll through the alternatives and select a particular alternative by clicking on the alternative suggestion. The user interface manager 330 provides the selected suggestion to the suggestion module 370. The suggestion module 370 determines whether the query is complete or the user should be presented with further alternatives. In an embodiment, the client application 140 receives a request to execute the query from the user and provides an indication to the natural language query processor 310 to execute the query. The query execution module 380 executes 760 the query. In an embodiment, the query execution module 380 generates the execution plan for executing the query as illustrated in FIG. 6.

In an embodiment, the suggestions module 370 selects alternative suggestions so as to maintain a total number of alternative suggestions within a low threshold value and a high threshold value. The suggestions module 370 selects an alternative suggestion with a high number of terms compared to an alternative suggestion with a low number of terms if the total number of alternative suggestions based on the low number of terms is below a low threshold. For example, if the total number of alternative suggestions based on 2 terms is very small (say 3), the suggestions module 370 uses more terms in alternative suggestions, say 3 terms or 4 terms. Similarly, suggestions module 370 selects an alternative suggestion with a low number of terms compared to an alternative suggestion with a high number of terms if the total number of alternative suggestions based on the high number of terms is above a high threshold. For example, if the total number of alternative suggestions based on 6 terms is very large (say 100), the suggestions module 370 uses fewer terms in alternative suggestions, say 5 or 4 terms.

Figure 8:
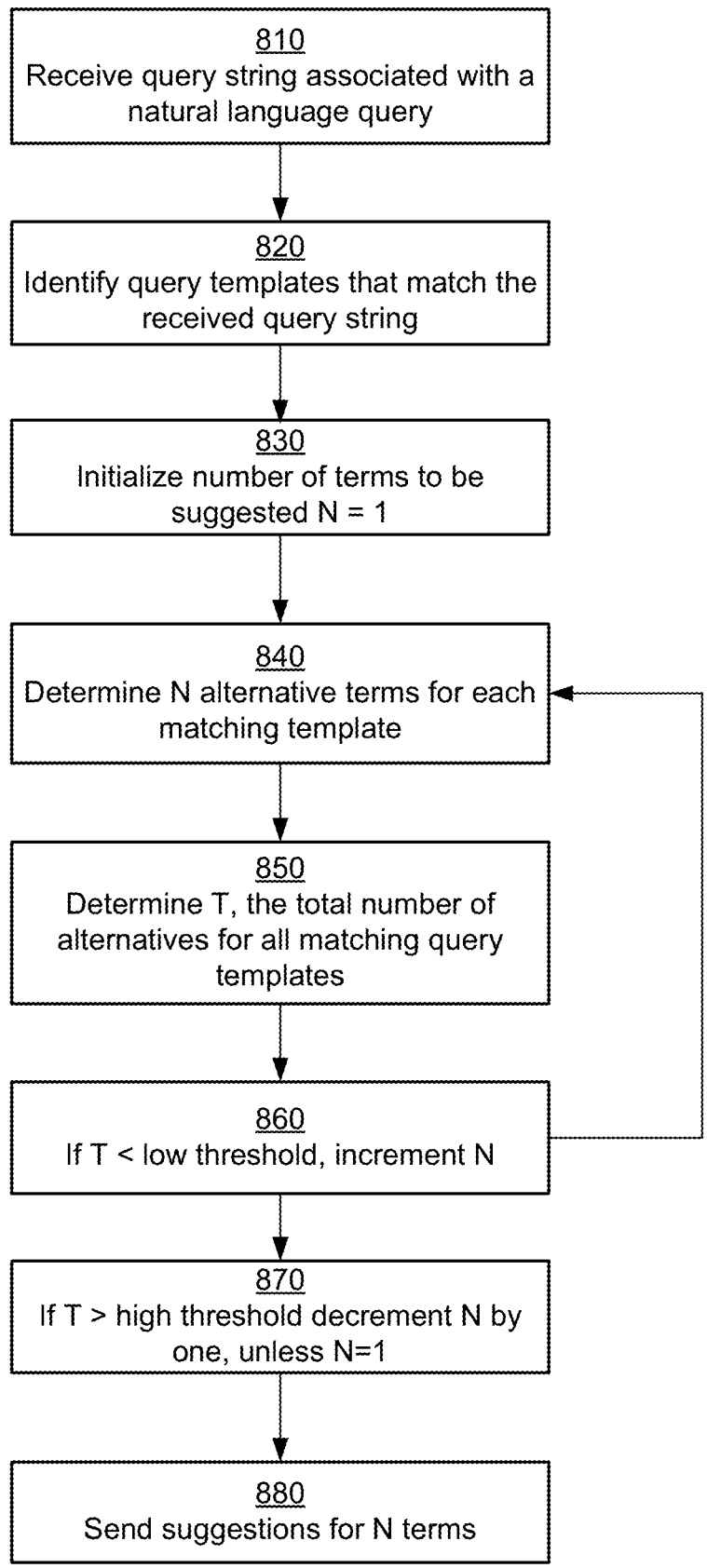
FIG. 8 illustrates the process for determining of the size of suggestions for a query string for building a natural language query, according to an embodiment of the invention.

FIG. 8 illustrates the process for determining of the size of suggestions for a prefix of a natural language query, according to an embodiment of the invention. The user interaction module 240 receives 810 an input prefix of a natural language query from the client application 140. The suggestion module 370 identifies 820 query templates stored in the query template store 390 that match the input natural language query prefix.

In an embodiment, the suggestion module 370 matches a query template by matching each term of the query template against the terms of the natural language query prefix. The suggestion module 370 may traverse the terms of the natural language query prefix and the query template in an order, for example, starting with the first term and matching each subsequent term.

If a term represents a keyword of the natural language sentence, the suggestion module 370 performs a string comparison of the term from the natural language query prefix and the term from the query template. If a term represents an attribute, for example, a column or a metric, the suggestion module 370 determines whether the specific instance of the term from the natural language query prefix is of the type of attribute specified by the query template at that position.

If the specific instance of the term from the natural language query prefix is of the type of attribute specified by the query template at that position, the suggestion module 370 determines that the two terms match and continues matching subsequent terms. If the specific instance of the term from the natural language query prefix is not of the type of attribute specified by the query template at that position, the suggestion module 370 rejects the query template as not matching the input query prefix. Accordingly, the suggestion module 370 identifies a set of query templates that match the input query prefix.

The process illustrated in FIG. 8 is repeated after every suggestion accepted by a user, as shown in FIG. 7. Accordingly, the suggestion module 370 matches the input query prefix against the set of query templates that matched the input query prefix of the previous iteration. This is so, because in each iteration, the sizes of the input query prefix increase by one or more terms. Accordingly, the number of query templates that match the input query prefix for an iteration is a subset of the set of query templates that match the query prefix of the previous iterations. In other words, at each iteration, the suggestion module 370 identifies the query templates of the previous iteration that still match the query prefix after adding the one or more terms.

The suggestion module 370 initializes 830 the number of terms to be suggested to 1. Accordingly, the suggestion module 370 determines 840 the number of alternative suggestions of single terms that can be added to the input query prefix based on the matching query templates. The suggestions module 370 determines alternative suggestions of N terms for each matching query template. For example, if N=1, a first query template may provide a single alternative whereas another query template may provide multiple alternatives. The suggestions module 370 determines 850 the total number of alternative suggestions for all matching query templates (say T).

The suggestions module 370 compares the value of T with a low threshold and a high threshold. The low threshold is a parameter indicating that the number of suggestions is low and the suggestions module 370 should determine more suggestions. The suggestions module 370 increases the number of terms in suggestions to increase the total number of alternative suggestions. The high threshold is a parameter indicating that the number of suggestions is high and would result in poor user experience and accordingly, the suggestions module 370 should reduce the number of suggestions if possible. The suggestions module 370 reduces the number of terms suggested to reduce the number of alternative suggestions. Accordingly, the suggestions module 370 determines the number of terms suggested based on the number of alternative suggestions.

The suggestions module 370 compares 860 the value T (of number of alternative suggestions of all matching queries based on N terms) with the low threshold value. If the value of T is below the low threshold value, the suggestions module 370 increments the value of N and repeats the steps 840 and 850 to determine a new set of alternative suggestions of N terms based on all matching templates. If the value of T is not less that the low threshold, the suggestions module 370 compares 860 the value T with the high threshold value. If the value of T is determined to be higher than the high threshold, the suggestions module 370 decrements the value of N and uses the suggestions for N terms, where the value of N is reduced. The suggestions module 370 decreases the value of N unless N=1, in which case the suggestions module 370 uses the current suggestions determined for N=1. The suggestions module 370 sends the suggestions to the user interface manager 330 for presentation to the user.

In some embodiments, the suggestions module 370 increments 860 the value of N for some of the alternatives but not all. For example, assume that the current value of N is two and there are two alternatives x1 and x2. The suggestions module 370 checks the number of alternatives contributed by x1 if N is incremented and the number of alternatives contributed by x2 if N is incremented. For example, x1 contributes to n1 alternatives and x2 contributes to n2 alternatives if N is incremented. The suggestions module 370 determines that n1+n2 exceeds the high threshold. Accordingly, the suggestions module increments N for only a subset of alternatives available. For example, the suggestions module 370 may suggest n2 alternatives of size N+1 based on x2 but leave x1 as a single alternative based on size N. If the user selects alternative x1, the suggestions module 370 eliminates all alternatives based on x2 and suggests the n1 alternatives based on x1. If the user selects any alternative based on x2, the suggestions module 370 eliminates the alternative based on x1, and continues expanding the alternative selected by the user.

If the suggestions module 370 determines that a term to be included in the suggestions is a column name or user defined metric, the suggestions module 370 identifies and lists all the column names of the dataset and user defined metrics that may be applicable in a given context within the query template. If the input query string includes a particular prefix or portion of the column name or user defined metric, the suggestions module 370 limits the number columns and user defined metrics included in the suggestions to the columns/metrics that start with the particular prefix or contain the portion of the column name.

The suggestions module 370 allows queries to be "extended" with either a filter clause or a pivot clause. The framework detects that a particular term is in the query portion or in the extension portion based on the query template. If the suggestions module 370 determines that a term represents a column in the pivot portion of the query extension, the suggestion module 370 identifies categorical columns and generates suggestions based on the categorical columns. This is so because categorical columns store a finite number of distinct values and a user is likely to breakdown results by a categorical column.

In contrast, is a term represents column names within the query portion (and not the extension portion), the suggestion module 370 determines suggestions based on all columns (whether or not they are categorical). If the suggestion module 370 determines that a term is in the filter clause, the suggestions module 370 may suggest column names as well as values. More specifically, if the suggestions module 370 determines that a term represents a left operand of an expression of the filter clause (where the expression is of the form <left operand> <operator> <right operand>), the suggestion module 370 suggests column names. More specifically, if the suggestions module 370 determines that a term represents a right operand of an expression of the filter clause, the suggestions module 370 determines suggestions based on values stored in the column of the left hand. For example, if input query string includes a filter clause specified as "where airport=S", the suggestions module 370 identifies values stored in the airport column that start with "S", for example, "SFO", "SJC" and so on.

If the suggestions module 370 determines that the left operand of a filter clause is a numeric column, the suggestions module 370 determines suggestions based on summary statistics based on values stored in the column corresponding to the left operand. For example, the suggestions may include filter clauses that constrain the results of the natural language query by expressions based on the summary statistics. In an embodiment, the suggestions module 370 determines different percentile values based on values stored in the column and suggests ranges based on the percentile values. For example, if the suggestions module 370 determines that the 25th, 50th (median) and 75th percentile values for a column arrival_delay (specified as the left operand) are v1, v2, and v3 respectively, the suggestions module 370 may include in suggestions expressions "for arrival_delay <v1," "for arrival_delay between v1 and v2," and "for arrival_delay >v3." IN general, the suggestions module 370 identifies a plurality of percentile values including a low percentile and a high percentile. The suggestions module 370 includes a suggestion based on a condition identifying values of the column that are less than the low percentile value, a suggestion based on a condition identifying values of the column that are greater than the high percentile value, and a suggestion based on a condition identifying values of the column that are between the low and the high threshold values.

In an embodiment, the suggestions module 370 supports a fast forwarding feature that allows execution of a partially filled query. The suggestions module 370 incrementally shows suggestions for a partially entered query. The natural language query processor 310 receives user selections for the suggestions. This process may be repeated a few times.

At some stage, while the user has not specified the complete query, the user may enter a special character indicating the user is submitting the partially entered query. If the natural language query processor 310 determines that all canonical parameters of the query are available in the partially entered query, the natural language query processor 310 fills the remaining parameters based on default values available for the query template. For example, the natural language query processor 310 may complete a partially entered query "forecast revenue", to a full natural language query "forecast revenue the next 30 days by order_date" where the various parameters are filled based on default values for the query template for forecasting revenue. The natural language query processor 310 executes the complete query.

Extensible Architecture for Natural Language Queries for Big Data Analysis

The query template based architecture for processing natural language queries for big data analysis allows users to extend the set of query templates by adding new query templates to the query template data store 390. An enterprise or organization that uses the big data analysis system 100 may perform data analysis for a specific domain, for example, finance, or scientific information. Accordingly, the users of that enterprise or organization typically need a restricted vocabulary applicable to that particular domain. In other words, such organizations/enterprises do not need a very generic natural language query processor that can take arbitrary natural language query. The ability to add query templates allows organizations/enterprises to build their own database of query templates that is capable of processing the typical queries that users perform in that domain. As new types of natural queries are identified, a system administrator or a privileged user may add newer query templates. The data analysis system may store multiple query templates having the same query intent. Accordingly, the data analysis system allows users to specify different types of natural language sentences for specifying the same set of instructions. For example, the data analysis system may allow users to specify a query intent of comparing two columns as any one of sentences: "show me comparison of X and Y", "compare X and Y", "please compare X with Y" and so on. The query intent is associated with a set of attributes. The queries based on a query intent take as input the set of attributes associated with the query intent. For example, the query intent of comparing two attributes takes as input at least a first attribute and a second attribute. Each of these query templates specifies the same set of attributes, i.e., the set of attributes associated with the query intent.

Figure 9:
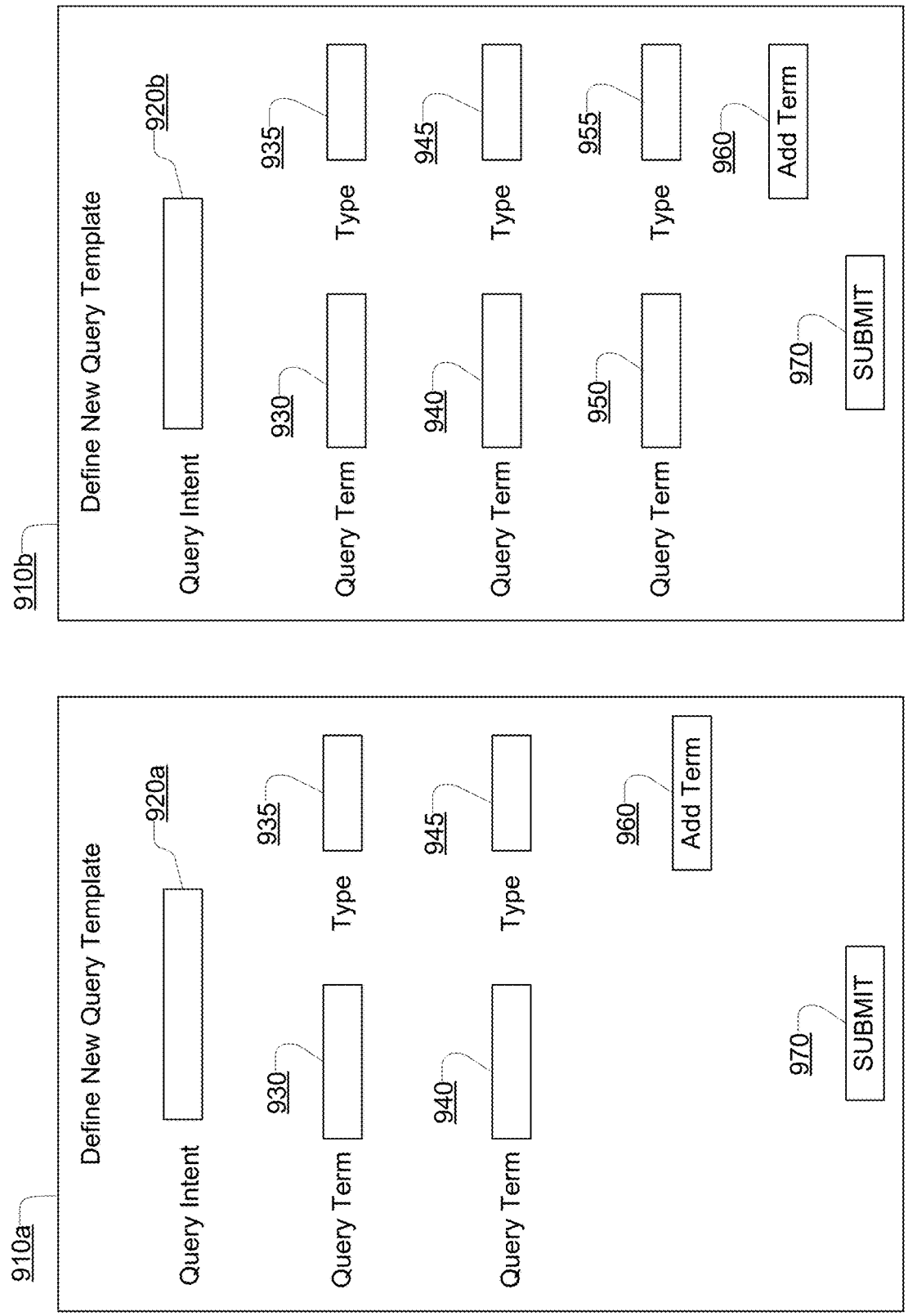
FIG. 9 shows a user interface for allowing users to add templates for natural language queries for big data analysis, according to an embodiment of the invention.

FIG. 9 shows a user interface for allowing users to add templates for natural language queries for big data analysis, according to an embodiment of the invention. The user interface manager 330 presents the user interface shown in FIG. 9 to a user via a client application 140. The user interface manager 330 receives information provided by a user via the user interface shown in FIG. 9 and provides the information to the natural language query processor 310 for validating and storing in the query template store 390.

The user interface 910 includes a widget 920 to allow a user to input a query intent. The query intent determines the processing performed by queries matching the natural language query template. For example, the query intent may specify that the natural language query template is for queries that determine an association between two attributes (or columns) of a dataset. Another query intent may specify that the natural language query template is for queries that perform forecasting. Another query intent may specify that the natural language query template is for performing comparison of attributes of the dataset.

The widget 920 allows the user to select from all available query intents, i.e., query intents previously defined by the natural language query processor 310 and stored in the query intent store 325. A query intent is defined by associating a query intent identifier (a string, integer, or any other identifier), with instructions or code for processing queries identified as having that query intent. The code or instructions for a query intent are stored in the query intent store 325. The query template identifies various parameters that are used by the instructions of the query intent.

As an example, if the query intent defines a relationship between two columns of a query, the query template identifies the two columns. For example, the query template comprising components: the phrase "show me the relationship between", a first column, the term "and", and a second column provides the first column and second column as parameters to the instructions for query intent defining relationship between two columns. A specific query, for example, "show me the relationship between arrival_delay and airport" is matched against the above query template to determine that the first column name is "arrival_delay" and the second column name is "airport." The natural language query processor 310 processes this query by matching the query against the query template to determine that the query intent corresponds to showing relationship between two columns, identifying the names of the two columns (i.e., arrival_delay and airport), and invoking the set of instructions corresponding to the query intent by providing the identified column names as parameters.

In an embodiment, the widget 920 presents all available query intents as string values via a drop down list. The widget 920 also allows users to define a new query intent. If the user interface 910 receives a request to define a new query intent, the user interface 910 may present the user with other user interfaces to provide a definition of the query intent. The user interface includes a widget for specifying instructions corresponding to the query intent. For example, the user interface may include a widget that identifies a file storing the set of instructions for the query intent. The information received for defining a user intent includes instructions to process queries having that particular intent and one or more parameters received as input by the instructions from the query template. These instructions may be received as executable program code, for example, instructions that invoke APIs of the analytics framework 230 and/or the distributed data framework 200 to process and retrieve the data requested by a user. In an embodiment, the user interface 910 allows users to upload the code/instructions associated with a query intent as a file.

The user interface 910a further allows user to provide one or more query terms. The user interface 910a shows two widgets 930 and 940 that allow users to specify query terms. The user interface 910a allows a user to provide a type associated with each query term, for example via the widget 935 for query term 930 and via the widget 945 for query term 940.

A query term may be of type keyword that is a specific natural language word or phrase, for example, "show" or "what is the." A query term may be an attribute, for example, a column of a dataset or a user defined metric. A query term may be of type user defined metrics, further described herein. A query term may be of type operator used in an expression, for example, $<, >, =, =<, >=$, AND, OR, BETWEEN, LIKE and so on.

Since different query templates may have different number of query terms, the user interface 910 provides a widget 960 that allows a user to add a new query term. If the user selects the widget 960 of the user interface 910a, the user interface manager 330 provides the user with the user interface 910b that includes additional widgets for query term 950 and the type of the corresponding query term as 955. Once the user has provided all the required input for defining the query template, the user may use the widget 970 to submit the query template for processing.

Figure 10:
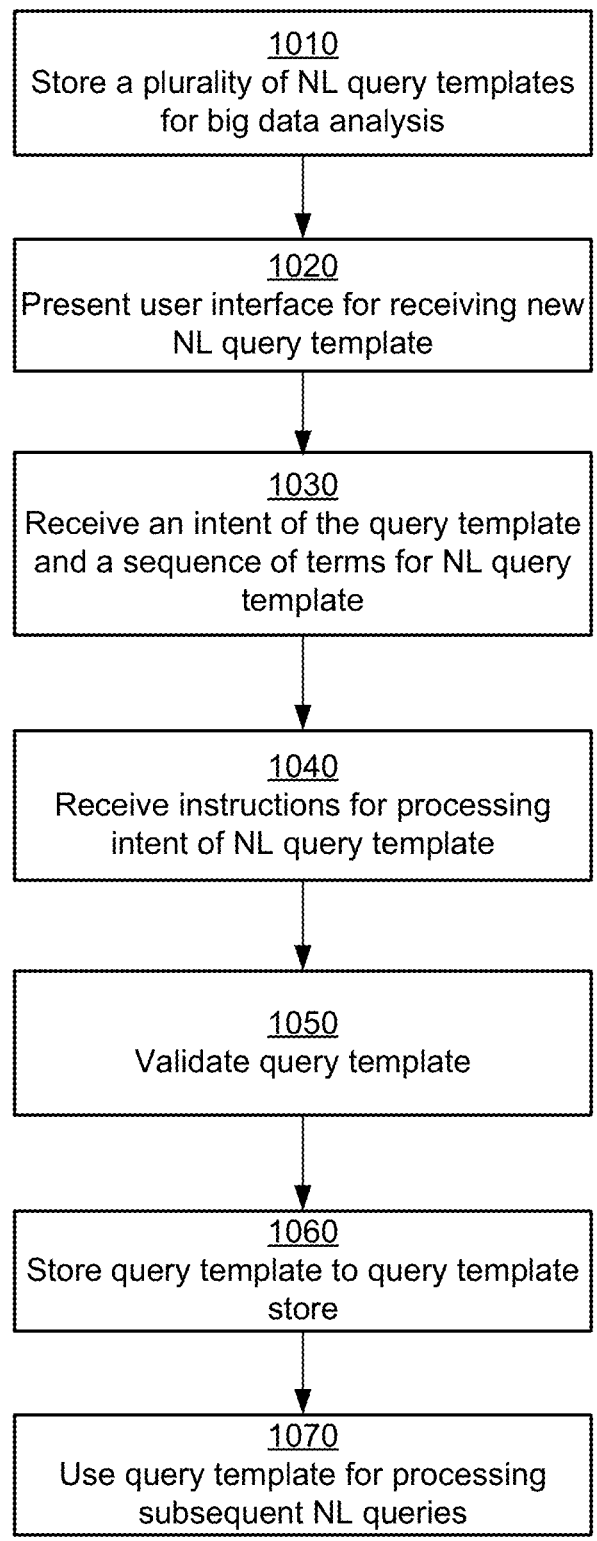
FIG. 10 illustrates the process by which the big data analysis system allows a user to define a new query template, according to an embodiment of the invention.

FIG. 10 illustrates the process by which the big data analysis system allows a user to define a new query template, according to an embodiment of the invention. The user interaction module 240 stores 1010 several query templates for performing big data analysis in the query template store 390. The user interface manager 330 presents 1020 the user interface 910 for receiving new query templates. In an embodiment, the user interaction module 240 checks if the user interacting with the user interface 910 has the required privilege to add new query templates.

The user interface manager 330 receives 1030 information describing the new query template being added via the user interface 910. The user interface manager 330 receives 1030 the intent of the query template and a sequence of query terms as illustrated in FIG. 9. If the intent of the query is previously defined in the big data analysis system 100 and stored in the query intent store 325, the user interface manager 330 associates the stored instructions defining the intent with the new query template. If the user defines a new query intent, the user interface manager 330 receives 1040 instructions that define the intent, for example, program code invoking APIs of the analytics framework 230 and/or the distributed data framework 200 that processes the data stored in the big data analysis system 100 in accordance with the intent of the query template. As an example, the code for query intent for queries that forecast certain value uses curve fitting techniques for determining a curve that fits for the given values of a column and determines a set of values for a future time range.

The natural language query processor 310 validates 1050 the query template. For example, the natural language query processor 310 verifies that any attributes specified in the query template have valid types. The natural language query processor 310 also ensures that the query template corresponds to syntactically valid natural language queries and conforms to grammatically valid natural language queries. The natural language query processor 310 stores 1060 the query template in the query template store 390. The natural language query processor 310 uses the new query template along with other query templates stored in the query template store 390 for processing queries subsequently received and for generating suggestions for partial natural language queries received from users.

Details of an example of query intent are as follows. An example query template processes queries that request the data analysis system to show relationship between two attributes. Example query templates having query intent that requests the data analysis system to show relationship between two attributes include "show relationship between <attribute1> and <attribute2>", "How are <attribute1> and <attribute2> related?", or "Please show relation between <attribute1> and <attribute2>." The query intent code for (or instructions of) the query intent to show relationship between two attributes determine a chart visualizing the relationship between the two input attributes. The chart is determined by the data analysis system 100 to be the best chart for visualizing the two attributes based on clarity of information presented in the chart, aesthetics, amount of information presented and other factors.

The query intent code checks if the query provides a pivot column (or pivot attribute). A pivot attribute may be specified if the query template includes a phrase "for each <attribute3>" or "breakdown by <attribute3>". Examples of query templates including pivot attribute include "show relationship between <attribute1> and <attribute2> for each <attribute3>" or "show relationship between <attribute1> and <attribute2> breakdown by <attribute3>." The query intent code determines the chart type used for displaying the relationships between the attributes based on the two input attributes for which the relationship is requested as well as the pivot attribute. For example, if the query requests relationship between two attributes without specifying any pivot attribute a particular chart may be used to visualize the relationship, whereas if the query includes a pivot attribute, a different chart is used for the visualization.

In an embodiment, the query intent code identifies one or more alternative chart types that the user can select instead of the default chart type for the relation. The query intent code provides the alternative chart types to the data visualization modules 320 and the data visualization module presents the alternatives to the user, allowing the user to select an alternative.

In an embodiment, the data analysis system 100 allows the user to modify the update the attribute type for a particular attribute. For example, the data analysis system 100 determines a numeric column having less than a threshold number of distinct values as a categorical column and determines the numeric column as having a numeric type if the number of distinct values stored in the column is greater than a threshold value. However, the query intent code provides an indication that the type of a column can be changed, for example, a numeric attribute can be changed to a categorical attribute or a categorical attribute can be changed to a numeric attribute. If the data analysis system 100 receives a request to modify the type inferred by the data analysis system 100 for an attribute, the data analysis system 100 uses the new type of the attribute. The chart type determined for showing relationship between two attributes may change if the type of an attribute is changed.

Examples of Query Templates

An example query template allows users to ask natural language queries requesting the big data analysis system 100 to show relationship between two sets of values. Each set of values may be a column or a user defined metric. Accordingly, the query template identifies the following components of a natural language query conforming to the query template occurring in the following order: (1) the phrase "show relationship between", (2) a first attribute (or user defined metric), (3) the keyword "and", and (4) a second attribute (or user defined metric.) The query template specifies that the intent of the query template is a "relationship" intent. In an embodiment, the relationship intent retrieves data of the two attributes (or user defined intents) provided in the query and renders a chart illustrating how the first attribute varies with respect to the second attribute. The query template further specifies that natural language queries conforming to the relationship query template can include a filter clause. The filter clause comprises as keyword "where" followed by an expression that may comprises an attribute, followed by an operator, followed by another attribute (which may be a constant.)

The query template further specifies that natural language queries conforming to the relationship query template can include a pivot clause. A pivot clause specifies a keyword "breakdown by" and a pivot attribute. Given a pivot clause, the instructions based on the query identify distinct values of the pivot attribute. The natural language query processor 310 determines the relationship between the first attribute and the second attribute for each distinct value of the pivot attribute. For example, a query "show relationship between price and lotsize breakdown by state" presents data describing the relationship between price and lotsize for each state.

The natural language query processor 310 supports query template that match queries that request statistics of a particular attribute of the dataset. For example, the natural language query processor 310 supports queries of the form "what is the standard deviation of X?" The query template for such queries comprises the following components: (1) the phrase "what is the", (2) a phrase pattern of a statistical operation belonging from a predefined list, for example, "max", "min", "average", "median", "standard deviation", "25th-75th quartiles", or "distribution." (3) the keyword "of", and (4) an attribute (or user defined metric.) The query template allows an optional extension of a filter clause.

The natural language query processor 310 supports query templates that match queries requesting the top ranking elements of an attribute of the dataset. The components of the query template include: (1) The phrase "show top", (2) the phrase pattern allowing user to select from a predefined list "10", "20", "30" and so on (the user can specify any other number rather than pick a value from this list) (3) a first attribute, (4) a selection of one of the following phrases: "with highest" or "with lowest" (5) a second attribute.

The natural language query processor 310 receives queries matching this template and determines the top N values of the first attribute, ranked by the second attribute. For example, a query conforming to this query template may request "show top 10 employees with highest salaries." Accordingly, the first attribute is employee and the second attribute is salary. The query template allows an optional extension of a filter clause. For example, the user may filter the above clause by requesting "show top 10 employees with highest salaries from finance department." The filter clause "from finance department" causes the dataset to be filtered to consider only employees from a specific department, i.e., the finance department.

The natural language query processor 310 supports query templates that match queries requesting forecasting values of an attribute of the dataset. For example, a user may request "forecast sales for the next 30 days." A query template for processing forecast queries includes components: (1) keyword "forecast", (2) attribute, (3) phrase "for the next", (4) a number value, from one of a list of "10", "30", "60", "90" which can be customized by the user, (5) a unit of time, from a list of "days", "months", "quarters", "hours" and so on. The natural language query processor 310 processes a natural language query matching this template by retrieving values of the attribute and performing a forecasting technique on the dataset to extrapolate the values along a time dimension. The natural language query processor 310 checks for forecast queries that the dataset includes a column defining time dimension. The natural language query processor 310 uses the time column to associate data values of the attribute with specific points in time for applying the forecasting techniques. An example of a forecasting technique is Holt-Winters mechanism for forecasting. Other mechanisms for forecasting can be used, for example, forecasting based on linear prediction, extrapolation, trend estimation, curve fitting, and so on.

The natural language query processor 310 allows multiple query templates to be defined with the same query intent. For example, a query requesting relationship between two columns can be specified as "show relationship between A and B" by specifying the following components: (1) the phrase "show relationship between", (2) a first attribute, (3) the keyword "and", and (4) a second attribute. A second way to request the same information is using a natural language query "Do show me the relationship between A and B." This type of query is supported by a query template comprising following components: (1) phrase "Do show me the relationship between", (2) a first attribute, (3) the keyword "and", and (4) a second attribute. A third way to request the same information is using a natural language query "How are A and B related?" This type of query is supported by a query template comprising following components: (1) phrase "How are", (2) a first attribute, (3) the keyword "and", (4) a second attribute, and (5) keyword "related?" A fourth way to request the same information is using a natural language query "A vs. B please." This type of query is supported by a query template comprising following components: (1) phrase "How are", (2) a first attribute, (3) the keyword "and", (4) a second attribute, and (5) "please."

Accordingly, the natural language query processor 310 can support a plurality of ways of asking the same natural language query. Each different way can phrase the same query using a different type of natural language sentence. Each type of natural language sentence is specified using a query template having the same query intent. The natural language query processor 310 receives a natural language query and matches it against all query templates. The natural language query processor 310 determines that the natural language query matches one of the templates defined above and processes the requested information based on the query intent.

The natural language query processor 310 executes the following steps for determining the query intent for a query. The natural language query processor 310 receives a query for processing. The query parser 360 parses that query by tokenizing the terms of the query. The query parser 360 stems the word tokens obtained from the query. The natural language query processor 310 stores a mapping from keywords to query intents. The natural language query processor 310 determines the query intent for the input query based on the mapping. In an embodiment, the natural language query processor 310 stores a metric indicating a confidence level for each keyword to intent mapping. For example, mapping from keywords "relate" or "vs" to relationship intent is associated with 100% confidence, mapping from keywords "top" or "best" to top-n intent is associated with 100% confidence, mapping from keyword "project" to forecast intent is associated with 100% confidence, mapping from keyword "by" to relationship intent is associated with 40% confidence (e.g. "show sales by department" query) and so on. The natural language query processor 310 determines all query intents for the keywords occurring in the input query and selects the query intent with the highest confidence. The natural language query processor 310 selects the data attributes of the query in order of their occurrence in the query based on a matching with the query template. The natural language query processor 310 generates suggestions for a partially input query based on the selected intent and the collected data attributes. This process allows different variations of a query to be matches to the query, for example, all these queries match a relationship query: "is there a relationship between X and Y", "is X related to Y?", and "X vs Y".

In an embodiment, the natural language query processor 310 performs a substring search of query string from the space of all possible expanded query templates. Accordingly, if the natural language query processor 310 receives a very short partial query (partial query having less than a threshold number of query terms) from the user, the natural language query processor 310 can determine a suitable query. For example, e.g. if the natural language query processor 310 receives "sales", or "summary", or "deviation" as input, the natural language query processor 310 can identify the appropriate query template.

In an embodiment, the natural language query processor 310 performs an attribute token search. Accordingly, the natural language query processor 310 first finds the data attributes in the query. The natural language query processor 310 then finds matching sentences from the space of all possible expanded query templates. This approach is very effective when user types a short phrase, for example, "show arrdelay".

Visualization of Data Based on Natural Language Queries

In an embodiment, the data visualization module 320 determines a chart type for presenting based on one or more factors including the type of query intent specified in a query template, the type of attributes processed by the query template, and/or the cardinality of each attribute (i.e., the number of distinct values of an attribute.) In an embodiment, the data visualization module 320 determines the chart type used for queries conforming to a query template based on whether there is a pivot extension used by a query (in other words, whether the natural language query uses a pivot attribute or pivot column.)

As an example, assume that the data analysis system 100 receives a natural language query requesting relationship between a first attribute and a second attribute. If the data visualization module 320 determines that the first attribute is of type numeric and the second attribute is of type categorical, the data visualization module 320 determines the chart type to be a bar chart if the number of categories of the second attribute is below a threshold. However, if the data visualization module 320 determines that the number of categories of the second attribute is above the threshold, the categories of the second attribute is below a threshold determines the type to be a treemap. In this embodiment, the data visualization module 320 also suggests alternative chart types (for the user to select from) as pie chart, donut chart, or treemap (if default chart type is bar chart)

Furthermore, if the data visualization module 320 determines that the query uses a pivot extension (based on a third attribute) the data visualization module 320 determines the chart type to be a stacked bar chart. In this embodiment, the data visualization module 320 may suggest alternative chart types as grouped bar chart or small multiple bar charts.

As another example, assume that the data visualization module 320 determines that the first attribute is of type numeric and the second attribute is also of type numeric. In this case, the data visualization module 320 determines the chart type to be a scatter plot. The data visualization module 320 provides alternative chart types, for example, a hex binned scatter plot that groups of data points into hexagonal shaped bins. Accordingly, the chart presents a plurality of hexagonal shaped bins. The data visualization module 320 may determine the presentation of each hex bin based on the data points within each hex bin. For example, the data visualization module 320 may determine the color of a hex bin based on the number of data points within each hex bin.

If the data visualization module 320 determines that there is a pivot attribute specified in this query, the data visualization module 320 uses a small multiple hex binned plot (that presents one hex bin plot corresponding to each distinct value of the pivot attribute.) Alternatively, the data visualization module 320 uses a scatter plot with linear trend lines. Accordingly, the data visualization module 320 plots all values of the second attribute corresponding to each value of the pivot attribute against the values of the first attribute. The data visualization module 320 further connects (using liner trend lines) data points showing values of the second attribute that correspond to the same value of the third (pivot) attribute.

If the data visualization module 320 determines that the natural language query requests relationship between two attributes both of which represent categorical values, the data visualization module 320 determines the chart type to be a frequency heat map.

As another example, assume that the data analysis system 100 receives a query requesting top N values of an attribute. In this case, the data visualization module 320 determines the chart type to be a horizontal bar chart. If the data visualization module 320 determines that there is a pivot attribute specified in the query, the data visualization module 320 determines the chart type to be small multiple horizontal bar chart.

User Defined Metrics for Use in Natural Language Queries

Embodiments of the invention allow users to define metrics for use in natural language queries. These metrics may be defined by experts in data analysis. These metrics typically represent frequently used computations. Although natural language provides a user friendly mechanism for users to specify their data analysis queries, certain queries may be difficult to specify using natural language. For example, specific computations that specify certain expressions that are commonly used may be difficult to specify using natural language but simpler to define using the syntax of a programming language. Accordingly, the big data analysis system 100 receives from users, definitions of user defined metrics that represent reusable computations or expressions. These user defined metrics may not be available in the system as shipped to the user by the vendor of the system. These user defined metrics are typically added by users of the system. However a vendor may ship a system with support for one or more user defined metrics. User defined metrics may also be referred to as user defined keywords or user defined vocabulary.

The big data analysis system 100 receives a definition of a user defined metric that associates a keyword with an expression representing the user defined metric. The keyword associated with the user defined metric uniquely identifies the user defined metric. The big data analysis system 100 allows a user to use the keywords associated with the metrics in natural language queries. The big data analysis system 100 system receives natural language queries that use the user defined metrics and analyzes the natural language queries. In an embodiment, the natural language queries process data stored in data sets. The big data analysis system 100 processes the natural language queries to evaluate the results requested by the user and presents the results to the user, for example, visually as a chart.

Figure 11:
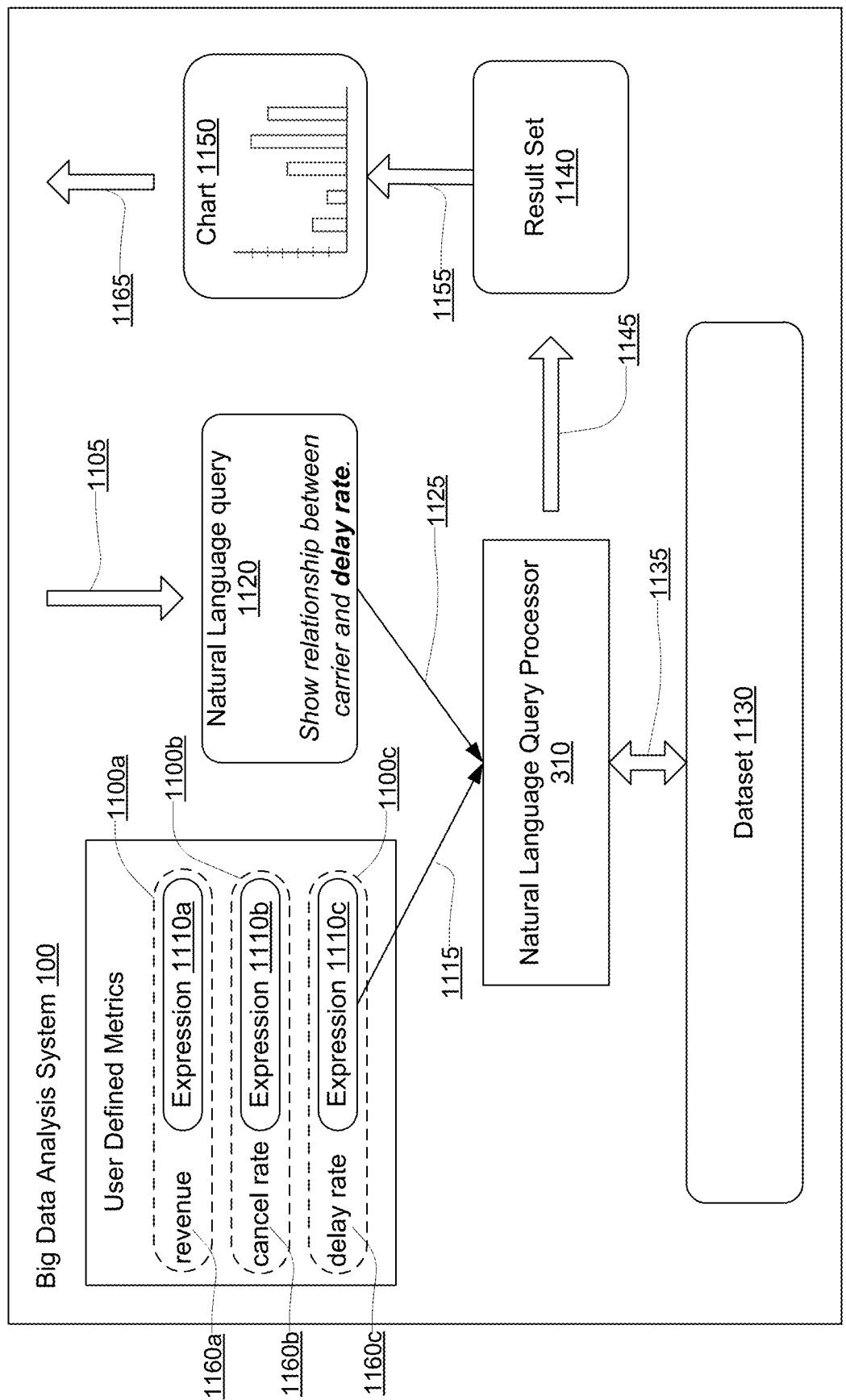
FIG. 11 shows the interaction between various objects represented in the big data analysis system for processing natural language queries using user defined metrics, in accordance with an embodiment.

FIG. 11 shows the interaction between various objects represented in the big data analysis system for processing natural language queries using user defined metrics, in accordance with an embodiment. The big data analysis system 100 receives and stores information describing user defined metrics 1100. The big data analysis system 100 receives natural language queries 1120 that use the user defined metrics. The big data analysis system 100 processes 1145 the natural language queries 1120 to generate a result set 1140. The big data analysis system 100 provides the result set to the user, for example, using a visual representation such as a chart 1150.

The big data analysis system 100 maintains a representation of user defined metrics 1100. In an embodiment, the representation is a mapping from keywords 1160 (a keyword can be a single word or a phrase) to expressions 1110. One or more keywords 1160 may map to an expression 1110 that defines a user defined metric 1100. A keyword 1160 may be a single word or a phrase comprising a plurality of words. For example, keyword 1160*a* ("revenue") maps to expression 1110*a*, keyword 1160*b* ("cancel rate") maps to expression 1110*b*, and keyword 1160*c* ("delay rate") maps to expression 1110*c*.

The big data analysis system 100 receives 1105 a natural language query 1120 that uses a keyword 1160 identifying a user defined metric 1100. For example, the natural language query 1120, "show relationship between carrier and delay rate" uses the phrase "delay rate" that is associated with the expression 1110*c*. The natural language query processor 310 receives 1125 the natural language query 1120 and analyzes the natural language query 1120. The natural language query processor 310 determines that "delay rate" is a phrase associated with a user defined metric. The natural language query processor 310 retrieves 1115 the expression that defines the user defined metric associated with the phrase "delay rate." The natural language query processor 310 analyzes the natural language query 1120 and interacts 1135 with the dataset 1130 to process the natural language query 1120.

The natural language query processor 310 determines 1145 a result set 1140 based on the natural language query 1120. The big data analysis system 100 generates 1155 a chart 1150 for visualization of the result set 1140. The big data analysis system 100 sends 1165 information describing the chart 1150 to a user for display, for example, via the client application 140.

Examples of User Defined Metrics

The natural language query processor 310 processes different types of user defined metrics. The big data analysis system 100 receives definitions of user defined metrics. The definition of the user defined metric associates a phrase with an expression. The phrase includes one or more keywords. Examples of phrases representing a user defined metrics include "revenue", "South America", "cancelled flights" and so on. The big data analysis system 100 receives a natural language query using a phrase associated with a user defined metrics. The big data analysis system 100 determines the intent of the natural language query. The big data analysis system 100 generates a database query for retrieving data of the dataset for processing the natural language query. The database query generated uses the expression associated with the user defined metric. The big data analysis system 100 determines where to use the expression in the database query based on various criteria including the type of user defined metric and the intent of the natural language query. For example, if the big data analysis system 100 is using structured query language (SQL) for processing the dataset, the big data analysis system 100 may use the expression in the SELECT clause of the database query specifying values retrieved from the dataset or in the WHERE clause of the database query as a filtering condition of the database query. The big data analysis system 100 executes instructions associated with the intent of the natural language query to determine result of the natural language query. The big data analysis system 100 executes the generated database query as part of the instructions for the intent of the query. The big data analysis system 100 determines the results of the natural language query and sends to the requestor, for example, a client application 140 executing on a client device 130.

An example of a user defined metric is a named subset of a set of values associated with a dataset. Accordingly, a natural language query using the user defined metric requests the data processed to be limited to records (or rows) of the dataset wherein an attribute has values specified in the named set. In an embodiment, the named subset of values is stored in a column of the dataset.

The natural language query processor 310 receives a user defined metric that maps a keyword (or name) to a set defined as an enumeration of values. For example, assume that the dataset includes a column for storing names of countries. The distinct values stored in the column can be enumerated as all possible names of countries. The natural language query processor 310 may receive a definition of a user defined metric representing a subset of countries, for example, "South America," "North America," and so on.

The big data analysis system 100 allows use of natural language queries that filter the data processed based on user defined metrics that act as named subsets. For example, a natural language query may be "what are the sales in South America?" The natural language query processor 310 determines that the received natural language query uses the named subset "South America" and applies a filer to the underlying queries used for processing the dataset to retrieve only sales information from rows that correspond to countries enumerated by the user defined metric "South America."

In an embodiment, the natural language query processor 310 generates a database query for retrieving data from the dataset for processing the natural language query. The natural language query processor 310 uses the named set in a condition of the database query, for example, a WHERE clause to filter records (or rows) of the dataset. For example, if the named set includes countries A, B, and C, the natural language query processor 310 includes a condition in the WHERE clause such as "country in (A, B, C)"

The big data analysis system 100 supports user defined metrics that transform values of a column to another set of values. These user defined metrics are referred to as computed variables and are defined using expressions. The values of the user defined metrics are computed on the fly as natural language queries are received. For example, a user can ask natural language queries based on computed variables and treat the computed variable as a column of the dataset, even though the big data analysis system 100 does not store any such column.

Assume that big data analysis system 100 stores dataset including a revenue column that stores revenue values in Euros. A user may specify a user defined metric "revenue in dollars" that converts values of revenue column specified in Euros to dollars. The big data analysis system may execute a API (application programming interface) to retrieve the current exchange rate between Euros and Dollars, for example, from a web service. The expression for the user defined metric multiplies the values retrieved from the revenue column of the dataset (in Euros) and applies appropriate conversion factor to determine the value in dollars.

A user may ask "show weekly revenue" to see the weekly revenues in Euros and another query "show weekly revenue in dollars" to see the weekly revenues in dollars. The big data analysis system 100 determines that the natural language query "show weekly revenue in dollars" is requesting data stored in column revenue of the dataset and applies the appropriate transformation function to the values of the revenue column to convert them to dollars.

The big data analysis system 100 supports user defined metrics that aggregate values over a dataset. The aggregate values may be performed over groups of rows of the dataset. A user defined metric may compute a sum or average over groups of rows of a dataset, for example, "total money spent," or "average sales." A user defined metric may determine a conditional count, i.e., a count of all rows that satisfy certain condition.

As an example, assume that a dataset has flight data. Each row stores data for a flight. A column of the dataset stores a flag indicating whether a flight is cancelled or not (e.g., if the column is called "cancelled", a value 1 stored in the column indicates flight is cancelled and a value 0 stored in the column indicates the flight is not cancelled.) A user defined metric "count of cancelled flights" is defined as expression "count(cancelled=1)" where "cancelled" refers to the column cancelled. A user defined metric may specify a ratio of conditional count and the total count. For example, a user defined metric may compute a percentage of flights cancelled. Accordingly, the use defined metric may be specified as "count(cancelled=1)/count(*)." A user defined metric may be defined to compute a count of all unique items, for example, all unique users or all unique session ids. The user defined metric may be specified as "(count distinct attribute)" where the attribute of the data set (or the column of the dataset) can be "user" or "session_id." The natural language query processor 310 processes a natural language query to show "cancelled flights" by including the expression defining "cancelled flights" as an attribute in the SELECT clause of a query.

Other complex expressions that aggregate values may be defined as user defined metrics. For example, a user defined metric may specify a count of rows that satisfy any particular criteria specified as an expression. For example, the user defined metric "late flights" may be associated with an expression "count(arrival_delay >10)" executed against a flight data. This expression determines all flights that had an arrival delay longer than a specified threshold (of 10).

The expression used for specifying a user defined metric may include logical conditions, for example, conditions based on logical "and", logical "or" operations and so on. Assume that a "cancellationcode" column of a flight dataset can have different possible value including A, B, C, and D. A user defined metric "cancelled flights" defined as the expression "count(cancellationcode=A OR cancellationcode=B)" determines counts of flights that satisfy certain criteria, i.e., all flights having cancellationcode values A or B. A user defined metric may use various operators including < >, !=, IN, BETWEEN, LIKE and may support mathematical functions such as log (logarithm), abs (absolute value), and so on.

The user defined metrics may aggregate values grouped by certain column. For example, cancelled flights may be grouped by airports to determine how many flights are cancelled from each airport. A query that determines all cancelled flights over an airport column is "show me cancelled flights by airports." The natural language query processor analyzes the natural language query to determine the column over which the user defined metric is being aggregated. In an embodiment, a query template identifies the various components of the natural query including the metric and the column by which the metric is grouped. The intent of the query template is associated with the type of underlying queries executed by the natural language query processor 310 for executing the natural language query.

A natural language query may correspond to a request to determine the metric grouped by a time value, e.g., "show me weekly trend of cancelled flights." A system administrator identifies a column of the dataset as representing the time dimension. Alternatively, the big data analysis system 100 analyzes values of the columns to determine which column corresponds to time values. The big data analysis system 100 analyzes the values to see the range of values of the column. The big data analysis system 100 also considers the fact that the values of the column are monotonically increasing to determine that the column represents time values. The big data analysis system 100 may confirm from a system administrator if the identification of the time column is correct. The big data analysis system 100 converts the values of the time column to discrete categories, for example, hours, days, weeks, months, and so on. The mapping from the time column to the discrete categories may be performed at runtime when a natural language query is executed or it may be precomputed and stored as a column in the dataset.

Processing of User Defined Metrics

Figure 12:
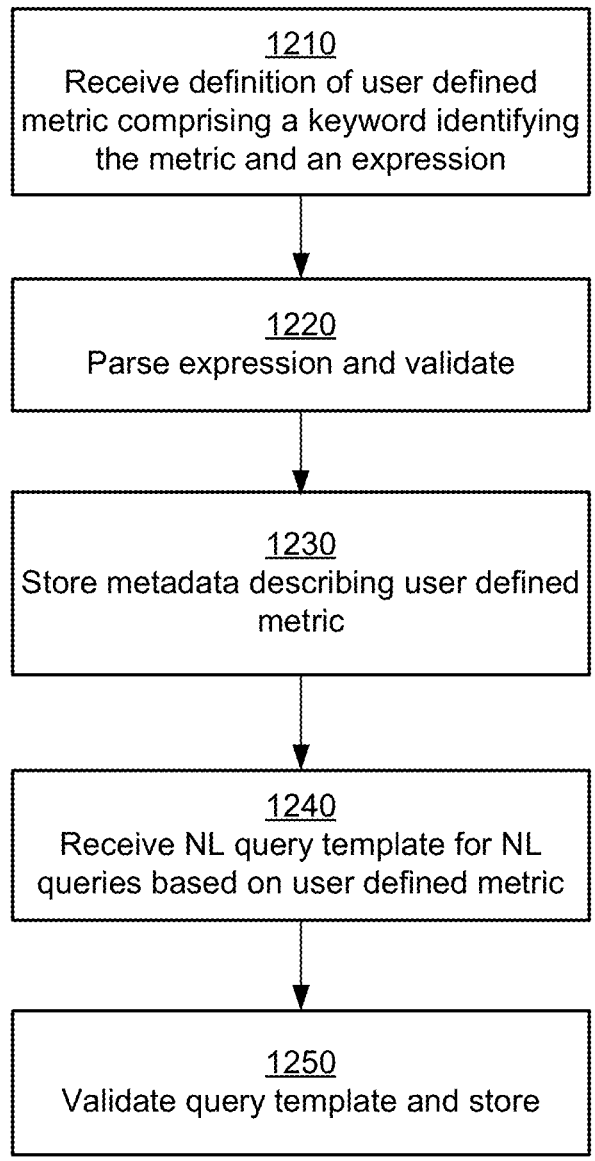
FIG. 12 shows a flowchart illustrating the process of defining a user defined metric, in accordance with an embodiment.

FIG. 12 shows a flowchart illustrating the process of defining a user defined metric, in accordance with an embodiment. The user defined metric module 345 receives 1210 a definition of the user defined metric. The definition of the user defined metric may be provided via a user interface, for example, a user interface of a client application 140. The definition of the user defined metric comprises a keyword for identifying the user defined metric and an expression defining the user defined metric. For example, the expression may compute an aggregate value over a dataset.

The user defined metric module 345 parses 1220 the expression and validates it. For example, the expression may refer to attributes or column names from the dataset. The user defined metric module 345 checks if the attributes/columns referred to in the expression are valid. The user defined metric module 345 also performs type checking to ensure that the expression performs valid computations based on the types of the attributes/columns referred to in the expression.

The user defined metric module 345 stores 1230 metadata defining the user defined metric in the user defined metric store 355. In an embodiment, the metadata describing user defined metric may be stored as database tables. The metadata associates the keyword identifying the metric with the expression defining the metric. In an embodiment, multiple keywords may be associated with the same user defined metric. A metric may be associated with a phrase comprising a plurality of keywords, for example, "total money spent" or "percentage of cancelled flights."

The natural language query processor 310 receives 1240 a natural language query template defining the structure of natural language queries based on the user defined metric. The natural language query processor 310 validates the natural language query template and stores metadata describing the natural language query template in the query template store 390. The natural language query processor 310 processes natural language queries based on the template as described in the process illustrated in FIG. 11.

Figure 13:
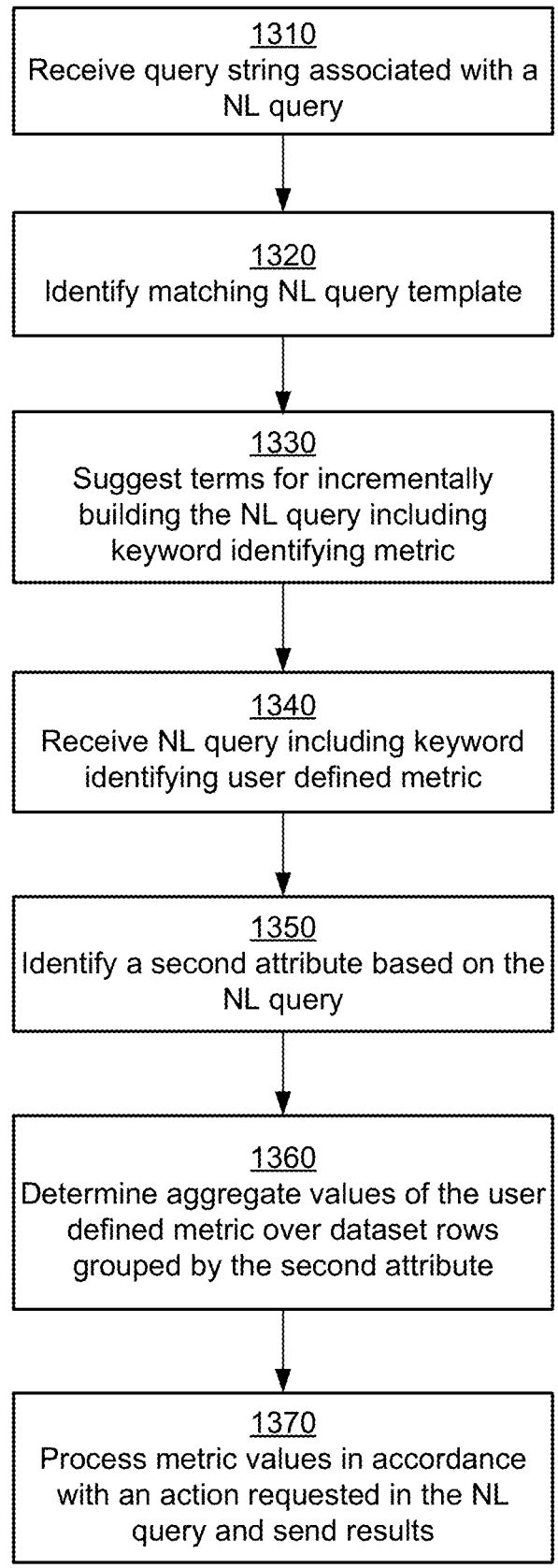
FIG. 13 shows a flowchart illustrating the process of defining and executing a natural language query based on a user defined metric, in accordance with an embodiment.

FIG. 13 shows a flowchart illustrating the process of defining and executing a natural language query based on a user defined metric, in accordance with an embodiment. The natural language query processor 310 receives 1310 a query string representing a portion of a natural language query. The natural language query processor 310 identifies 1320 all query templates that match the query string received. The suggestions module 370 determines and suggests 1330 alternative suggestions comprising terms for incrementally building the natural language query. The suggestions module 370 goes through an iterative process of providing suggestions and receiving a selection of a suggestion. One or more alternatives suggested include the keyword identifying the user defined metric.

Assuming the user selects a suggestion that includes the keyword identifying the user defined metric, the natural language query processor 310 receives 1340 the natural language query including the keyword identifying the user defined metric. The natural language query processor 310 analyzes the natural language query based on the matching template. For example, if the user defined metric performs an aggregation, the natural language query processor 310 identifies a second attribute used for grouping the rows of the dataset. The natural language query processor 310 may identify a column of the data set for grouping the rows for performing the aggregates. The natural language query processor 310 checks if the natural language query specifically mentions the column for grouping, for example, a query "show relationship between revenue and city." Alternatively, the natural language query processor 310 checks if the natural language query includes keywords that indicate whether the grouping is based on a column storing time information. For example, a query "show weekly trend of revenue" includes the keyword "weekly" that indicates that the grouping is performed by the time column mapped to weeks.

The natural language query processor 310 receives and processes different types of natural language queries based on user defined metrics. In the following examples, "revenue" is assumed to be a user defined metric. The user defined metric may define "revenue" as an expression based on various attributes of the dataset. A natural language query may request for information describing variation of a user defined metric with time, for example, "show revenue over time." The natural language query processor 310 receives and processes this query to show a chart displaying revenue vs. time.

A natural language query may request the big data analysis system to show relationship between an attribute (or column) of a dataset and a user defined metric For example, the natural language query processor 310 may receive a query "show relationship between revenue and region." The natural language query processor 310 analyzes this natural language query to determine that the user is requesting information describing relationship between a metric (revenue) and a column of the dataset (region). The natural language query processor 310 processes the natural language query to plot a chart of revenue vs. regions and send to the client application 140 for presentation.

The natural language queries may use other keywords supported by the natural language processor 310. In an embodiment, the natural language processor 310 supports "top" keyword for identifying the highest ranking attributes of a dataset based on certain criteria. For example, the natural language processor 310 may receive a natural language query "show top regions by revenue." The natural language processor 310 analyzes the natural language query to determine that the "top" keyword indicates that the user is interested in the highest ranking regions based on the user defined metric revenue. Accordingly, the natural language processor 310 generates queries to determine the revenues of various regions, ranks the regions by their revenue and selects the top ranking regions.

The natural language query processor 310 supports natural language queries for forecasting certain values. The natural language queries for forecasting values may use the "forecast" keyword, for example, "forecast weekly trend of cancellation rate." Alternatively, natural language query processor 310 may analyze other sentence structures to determine that the user is requesting forecast of certain values. These sentence structures match with templates that indicate the query intent is forecasting certain values. For example, the natural language query processor 310 may receive a query "show daily trend of revenue" and find a matching query template that indicates that the query requires forecasting.

The natural language query processor 310 supports natural language queries that break down the trend of certain metric by certain category (or attribute). The natural language query processor 310 receives a query of the form "show daily trend of metric for each category" and analyzes it, for example, "show daily trend of revenue for each region." The natural language query processor 310 analyzes this query to aggregate revenue for each region and determine the daily trend and perform forecasting based on the trend.

The definition of a user defined metric may be updated independent of the natural language queries. For example, user defined metric "revenue" may be defined using a particular expression and several natural language queries using the metric "revenue" may be stored by the big data analysis system 100 as documents. The big data analysis system 100 may update the definition of revenue upon request by an authorized user. For example, a business may use a new metric to define revenue. The big data analysis system 100 reevaluates all stored natural language queries using revenue metric to update the results of the natural language queries upon request.

As another example, the big data analysis system 100 may receive a user defined metric "important customers" that is a named subset, enumerating all important customers of a business. The big data analysis system 100 may store various natural language queries based on the metric, for example, "show me transactions of all important customer," "what is the trend of revenue from all important customers" and so on. The big data analysis system 100 determines that the user defined metric is a named subset. Accordingly, the big data analysis system 100 generates a database query for evaluating the natural language query. The big data analysis system 100 generates a database query that retrieves the requested customer information and adds a condition to the database query (e.g., a where clause) that filters the rows of the dataset processed to rows corresponding to customers identified as "important customers." For example, if the user defined metric "important customers" identifies customers "A, B, C" as important customers, the big data analysis system 100 appends a condition to the database query, for example, "where (customer in (A, B, C))" depending on the syntax supported by the database query language. The big data analysis system 100 processes the expression "customer in (A, B, C)" by evaluating the database query only for rows of dataset where the customer column has a value belonging to the set (A, B, C).

The big data analysis system 100 may receive an update to the definition of the user defined metric "important customers," for example, if new customers are recognized as important customers. Upon request, the big data analysis system 100 identifies all stored natural language queries that use the keywords "important customers" and reevaluates them. Furthermore, if subsequent natural language queries based on the keywords "important customers" are received, the big data analysis system uses the updated definition of the user defined metric.

Computer Architecture

Figure 14:
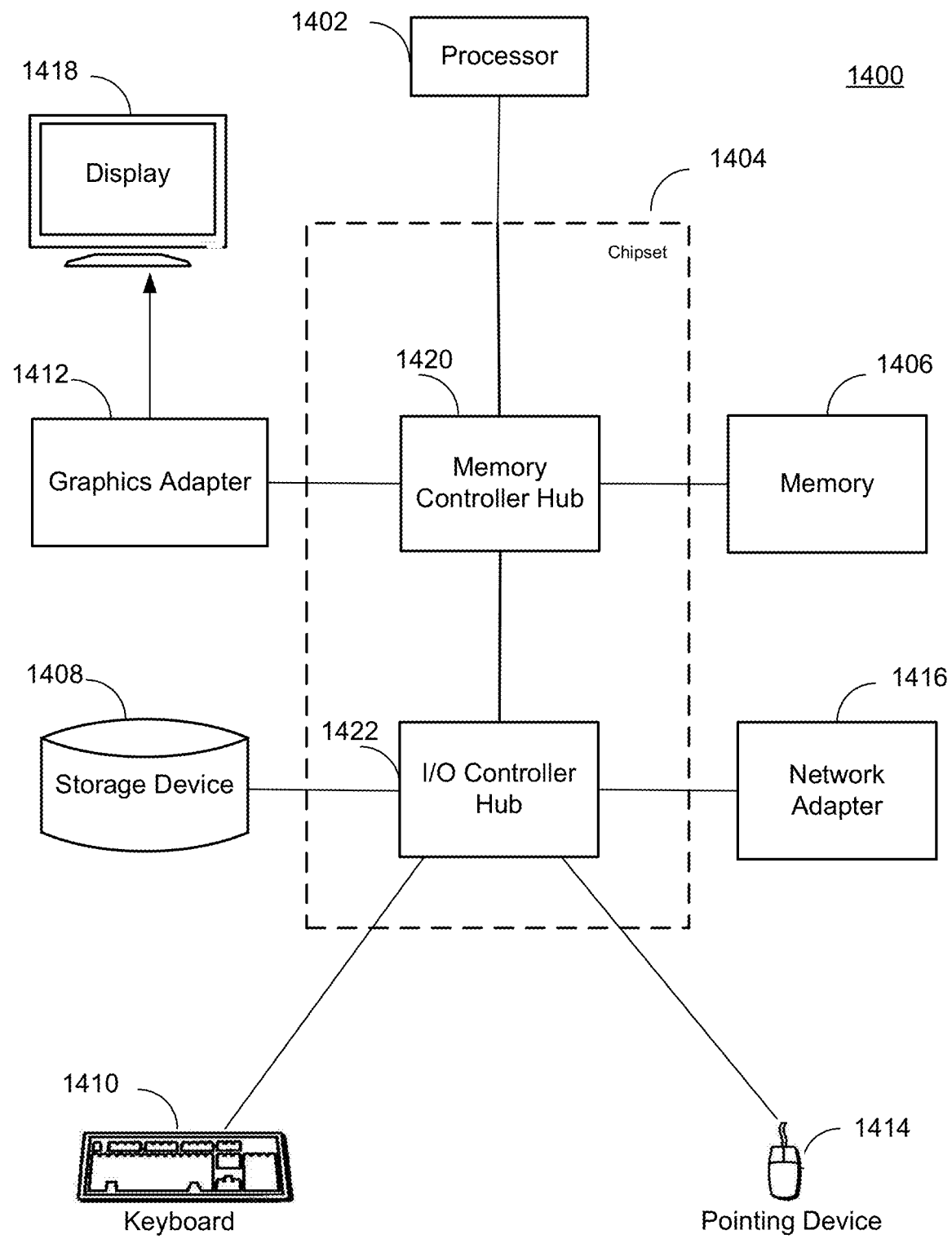
FIG. 14 is a high-level block diagram illustrating an example of a computer for use as a system for performing formal verification with low power considerations, in accordance with an embodiment.

FIG. 14 is a high-level block diagram illustrating an example of a computer for use in compression of scenarios, in accordance with an embodiment. The computer 1400 includes at least one processor 1402 coupled to a chipset 1404. The chipset 1404 includes a memory controller hub 1420 and an input/output (I/O) controller hub 1422. A memory 1406 and a graphics adapter 1412 are coupled to the memory controller hub 1420, and a display 1418 is coupled to the graphics adapter 1412. A storage device 1408, keyboard 1410, pointing device 1414, and network adapter 1416 are coupled to the I/O controller hub 1422. Other embodiments of the computer 1400 have different architectures.

The storage device 1408 is a non-transitory computer-readable storage medium such as a hard drive, compact disk read-only memory (CD-ROM), DVD, or a solid-state memory device. The memory 1406 holds instructions and data used by the processor 1402. The pointing device 1414 is a mouse, track ball, or other type of pointing device, and is used in combination with the keyboard 1410 to input data into the computer system 1400. The graphics adapter 1412 displays images and other information on the display 1418. The network adapter 1416 couples the computer system 1400 to one or more computer networks.

The computer 1400 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 1408, loaded into the memory 1406, and executed by the processor 1402. The types of computers 1400 used can vary depending upon the embodiment and requirements. For example, a computer may lack displays, keyboards, and/or other devices shown in FIG. 14.

Although embodiments disclosed herein describe natural language interface for interacting with big data analysis system, the techniques disclosed herein may be applied for any type of data analysis system. For example, the embodiments can be used for interacting with smaller data sets and are not limited to large datasets. Similarly, the embodiments can be used for interacting with simple datasets, for example, data sets that are uniform and have the same type of data instead of a complex mix of unstructured and structured data.

Alternative Embodiments

It is to be understood that the Figures and descriptions of the present invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for processing of natural language queries, the method comprising:
    storing, by a data analysis system, a plurality of natural language query templates created by users of a domain, each natural language query template comprising components including one or more attributes of a dataset, natural language keywords, and information describing order of the components, the stored plurality of natural language query templates specific to the domain;
    storing, for each natural language query template of at least some of the stored natural language query templates, one or more query intents associated with the natural query template, each of the query intents describing an operation to convert data using instructions corresponding to one of a plurality of user defined metrics that are specific to the domain, each of the plurality of user defined metrics compatible with a set of attributes of data, wherein at least two or more different natural language phrases are commonly associated with one of the query intents;
    configuring for presentation, a user interface for receiving a natural language query;
    receiving, via the user interface, an input query string;
    initializing a current query string to be the input query string;
    incrementally building a target natural language query based on the current query string by:
        matching the current query string against the plurality of stored natural language query templates,
        identifying the attributes of data specified by the current query string,
        determining that the attributes of data specified by the current query string are compatible to a particular user defined metrics that is specific to the domain,
        determining alternative suggestions for each matching query template, each alternative suggestion for a natural language query based on the matching query template, at least one of the alternative suggestion comprising a particular query intent that represents the operation to convert data using the instructions corresponding to the particular user defined metric,
        sending one or more alternative suggestions for presentation to the user, and
        receiving a selection of the at least one of the alternative suggestions that includes the particular query intent to modify the current query string;
    and
    generating a database query correspond to the target natural language query;
    retrieving data stored in a database in accordance with the database query;
    performing the operation associated with the particular query intent included in the selected alternative suggestion to convert the retrieved data based on the instructions corresponding to the particular user defined metric; and
    presenting converted data in a format that is different from the data stored in the database.

2. The method of claim 1, wherein a natural language query template specifies a phrase based on data of columns of the dataset with one or more operators and an alternative suggestion comprises a substring of the phrase.

3. The method of claim 1, wherein a natural language query template specifies a phrase representing an expression comprising a first operand and a second operand combined by an operator, wherein incrementally building the target natural language query further comprises:
    identifying a first plurality of columns of the dataset as the first operand and presenting each of the plurality of columns as one of the alternative suggestions, wherein each column of the dataset stores a plurality of values of a type;
    wherein receiving a selection of the one of the alternative suggestions comprises receiving a selection of a column from the first plurality of columns; and
    for a next iteration, selecting columns corresponding to the second operand as other alternative suggestions based on a type of the received selection of the column.

4. The method of claim 1, wherein determining alternative suggestions comprises maintaining a total number of alternative suggestions within a low threshold value and a high threshold value.

5. The method of claim 1, wherein determining alternative suggestions comprises selecting a first alternative suggestion with a high number of terms compared to a second alternative suggestion with a low number of terms if a total number of alternative suggestions based on the low number of terms is below a low threshold.

6. The method of claim 1, wherein determining alternative suggestions comprises selecting an alternative suggestion with a low number of terms compared to an alternative suggestion with a high number of terms if a total number of alternative suggestions based on the high number of terms is above a high threshold.

7. The method of claim 1, wherein determining alternative suggestions comprises:
    determining a first set of alternative suggestions, each alternative suggestion having a first number of terms; and
    responsive to a total number of alternative suggestions of the first set being below a low threshold, selecting a second set of alternative suggestions, each alternative suggestion of the second set having a second number of terms greater than the first number of terms.

8. The method of claim 7, wherein determining alternative suggestions comprises:
    responsive to a total number of alternative suggestions of the first set being above a high threshold, selecting a second set of alternative suggestions, each alternative suggestion of the second set having a second number of terms less than the first number of terms.

9. The method of claim 1, wherein responsive to the current query string identifying a column, including an alternative suggestion including terms of a filter clause, the filter clause specifying an expression based on summary statistics of the identified column.

10. The method of claim 9, wherein the filter clause specifies a range of values based on percentile values based on data of the identified column.

11. The method of claim 1, wherein responsive to determining that the current query string includes a filter clause identifying a column, including one or more of the alternative suggestions that complete the filter clause, the alternative suggestions including values from the identified column.

12. The method of claim 1, wherein the available query intents include:
    determining relationship between two columns of the dataset;
    comparing between two attributes of the dataset;
    requesting statistics describing a column of the dataset;
    generating a first user defined metric of the dataset;

comparing a second user defined metric to the first user defined metric; or filtering the dataset based on a user defined filter.

13. A non-transitory computer readable medium storing code instructions, when executed by one or more processors, cause the one or more processors to perform steps comprising:

storing, by a data analysis system, a plurality of natural language query templates created by users of a domain, each natural language query template comprising components including one or more attributes of a dataset, natural language keywords, and information describing order of the components, the stored plurality of natural language query templates specific to the domain;

storing, for each natural language query template of at least some of the stored natural language query templates, one or more query intents associated with the natural query template, each of the query intents describing an operation to convert data using instructions corresponding to one of a plurality of user defined metrics that are specific to the domain, each of the plurality of user defined metrics compatible with a set of attributes of data, wherein at least two or more different natural language phrases are commonly associated with one of the query intents;

configuring for presentation, a user interface for receiving a natural language query;

receiving, via the user interface, an input query string;

initializing a current query string to be the input query string;

incrementally building a target natural language query based on the current query string by:

matching the current query string against the plurality of stored natural language query templates, identifying the attributes of data specified by the current query string, determining that the attributes of data specified by the current query string are compatible to a particular user defined metrics that is specific to the domain, determining alternative suggestions for each matching query template, each alternative suggestion for a natural language query based on the matching query template, at least one of the alternative suggestion comprising a particular query intent that represents the operation to convert data using the instruction corresponding to the particular user defined metric, sending one or more alternative suggestions for presentation to the user, and receiving a selection of the at least one of the alternative suggestions that includes the particular query intent to modify the current query string;

generating a database query correspond to the target natural language query;

retrieving data stored in a database in accordance with the database query;

performing the operation associated with the query intent included in the selected alternative suggestion to convert the retrieved data based on the instructions corresponding to the particular user defined metric; and presenting converted data in a format that is different from the data stored in the database.

14. The non-transitory computer readable medium of claim 13, wherein a natural language query template specifies an expression comprising a first operand and a second operand combined by an operator, wherein incrementally building the target natural language query further comprises:

identifying a first plurality of columns of the dataset as the first operand and presenting each of the plurality of columns as one of the alternative suggestions, wherein each column of the dataset stores a plurality of values of a type;

wherein receiving a selection of the one of the alternative suggestions comprises receiving a selection of a column from the first plurality of columns; and for a next iteration, selecting columns corresponding to the second operand as other alternative suggestions based on a type of the received selection of the column.

15. The non-transitory computer readable medium of claim 13, wherein determining alternative suggestions comprises maintaining a total number of alternative suggestions within a low threshold value and a high threshold value.

16. The non-transitory computer readable medium of claim 13, wherein responsive to the current query string identifying a column, including an alternative suggestion including terms of a filter clause, the filter clause specifying an expression based on summary statistics of the identified column.

17. The non-transitory computer readable medium of claim 13, wherein responsive to determining that the current query string includes a filter clause identifying a column, including one or more of the alternative suggestions that complete the filter clause, the alternative suggestions including values from the identified column.

18. A computer system comprising:

a computer processor; and a non-transitory computer readable medium storing code instructions, when executed by one or more processors, cause the one or more processors to perform steps comprising:

storing, by a data analysis system, a plurality of natural language query templates created by users of a domain, each natural language query template comprising components including one or more attributes of a dataset, natural language keywords, and information describing order of the components, the stored plurality of natural language query templates specific to the domain;

storing, for each natural language query template of at least some of the stored natural language query templates, one or more query intents associated with the natural query template, each of the query intents describing an operation to convert data in using instructions corresponding to one of a plurality of user defined metrics that are specific to the domain, each of the plurality of user defined metrics compatible with a set of attributes of data, wherein at least two or more different natural language phrases are commonly associated with one of the query intents;

configuring for presentation, a user interface for receiving a natural language query;

receiving, via the user interface, an input query string;

initializing a current query string to be the input query string;

incrementally building a target natural language query based on the current query string by:

matching the current query string against the plurality of stored natural language query templates, identifying the attributes of data specified by the current query string, determining that the attributes of data specified by the current query string are compatible to a particular user defined metrics that is specific to the domain, determining alternative suggestions for each matching query template, each alternative suggestion for a natural language query based on the matching query template, at least one of the alternative suggestion comprising a particular query intent that represents the operation to convert data using the instructions corresponding to the particular user defined metric, sending one or more alternative suggestions for presentation to the user, and receiving a selection of the at least one of the alternative suggestions that includes the particular query intent to modify the current query string;

generating a database query correspond to the target natural language query;

retrieving data stored in a database in accordance with the database query;

performing the operation associated with the particular query intent included in the selected alternative suggestion to convert the retrieved data based on the instructions corresponding to the particular user defined metric; and presenting converted data in a format that is different from the data stored in the database.

* * * * *